(12) United States Patent
Hori et al.

(10) Patent No.: US 10,730,429 B2
(45) Date of Patent: Aug. 4, 2020

(54) LIGHTING SYSTEM AND SENSOR SYSTEM

(71) Applicant: KOITO MANUFACTURING CO., LTD., Tokyo (JP)

(72) Inventors: Takashi Hori, Shizuoka (JP); Teruaki Yamamoto, Shizuoka (JP); Yusuke Kasaba, Shizuoka (JP); Yoshiaki Fushimi, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/324,695

(22) PCT Filed: Aug. 2, 2017

(86) PCT No.: PCT/JP2017/028098
§ 371 (c)(1),
(2) Date: Feb. 11, 2019

(87) PCT Pub. No.: WO2018/030239
PCT Pub. Date: Feb. 15, 2018

(65) Prior Publication Data
US 2019/0184888 A1 Jun. 20, 2019

(30) Foreign Application Priority Data

Aug. 12, 2016 (JP) .................................. 2016-158725
Aug. 12, 2016 (JP) .................................. 2016-158726
Mar. 22, 2017 (JP) .................................. 2017-055703

(51) Int. Cl.
*B60Q 1/06* (2006.01)
*B60Q 1/068* (2006.01)
(Continued)

(52) U.S. Cl.
CPC ............. *B60Q 1/0683* (2013.01); *B60Q 1/00* (2013.01); *B60Q 1/04* (2013.01); *B60Q 1/2615* (2013.01);
(Continued)

(58) Field of Classification Search
CPC .......... B60Q 1/0683; B60Q 1/00; B60Q 1/04; B60Q 1/2615; B60Q 1/30; G01S 17/931; G01S 7/4814; G01S 7/497
See application file for complete search history.

(56) References Cited

U.S. PATENT DOCUMENTS 5,313,213 A 5/1994 Neumann et al.
6,203,556 B1 3/2001 Cook
(Continued)

FOREIGN PATENT DOCUMENTS

DE 10 2009 047 303 A1 6/2011
DE 10 2011 106 178 A1 3/2013
(Continued)

OTHER PUBLICATIONS

International Search Report (PCT/ISA/210) dated Oct. 31, 2017 issued by the International Searching Authority in International Application No. PCT/JP2017/028098.
(Continued)

*Primary Examiner* — Anne M Hines
(74) *Attorney, Agent, or Firm* — Sughrue Mion, PLLC

(57) ABSTRACT

A light source (14) is configured to emit light for lighting a predetermined area. A LiDAR sensor (15) is configured to sense information of an outside of a vehicle. A first screw mechanism (16) is configured to adjust posture of the light source (14). A second screw mechanism (17) is configured to adjust posture of the LiDAR sensor (15). Adjustment by one of the first screw mechanism (16) and the second screw mechanism (17) is performed on the basis of adjustment that
(Continued)

has been performed by the other one of the first screw mechanism (16) and the second screw mechanism (17).

13 Claims, 16 Drawing Sheets

(51) Int. Cl.
  *B60Q 1/00* (2006.01)
  *B60Q 1/04* (2006.01)
  *G01S 17/931* (2020.01)
  *B60Q 1/26* (2006.01)
  *B60Q 1/30* (2006.01)
  *G01S 7/481* (2006.01)
  *G01S 7/497* (2006.01)
  *G01S 17/93* (2020.01)
  *G05D 1/02* (2020.01)

(52) U.S. Cl.
  CPC .............. *B60Q 1/30* (2013.01); *G01S 7/4814* (2013.01); *G01S 7/497* (2013.01); *G01S 17/931* (2020.01); *G01S 17/93* (2013.01); *G05D 1/0231* (2013.01); *G05D 2201/0213* (2013.01)

(56) References Cited

U.S. PATENT DOCUMENTS

| | | |
|---|---|---|
| 2002/0054496 A1 | 5/2002 | Fujino et al. |
| 2004/0167697 A1 | 8/2004 | Albou et al. |
| 2011/0184610 A1 | 7/2011 | Laliron et al. |
| 2014/0029278 A1 | 1/2014 | Burton |
| 2017/0274787 A1* | 9/2017 | Salter .................. B60L 11/1829 |
| 2017/0307730 A1 | 10/2017 | Baba |
| 2018/0339645 A1* | 11/2018 | Ekkizogloy ............. F21S 41/00 |

FOREIGN PATENT DOCUMENTS

| | | |
|---|---|---|
| EP | 1 437 258 A1 | 7/2004 |
| EP | 2 305 514 A1 | 4/2011 |
| EP | 2 347 933 A2 | 7/2011 |
| FR | 2 717 131 A1 | 9/1995 |
| JP | 5-27037 A | 2/1993 |
| JP | 2003-302469 A | 10/2003 |
| JP | 2010-185769 A | 8/2010 |
| JP | 2011-43944 A | 3/2011 |
| JP | 2015-187589 A | 10/2015 |
| JP | 2016-97805 A | 5/2016 |
| WO | 2016/047689 A1 | 3/2016 |

OTHER PUBLICATIONS

Written Opinion (PCT/ISA/237) dated Oct. 31, 2017 issued by the International Searching Authority in International Application No. PCT/JP2017/028098.
Partial Search Report dated Mar. 18, 2020 by the European Patent Office in counterpart European Patent Application No. 17839311.2.
Communication dated Jun. 25, 2020 issued by the European Patent Office in corresponding European Application No. 17839311.2.

* cited by examiner

LIGHTING SYSTEM AND SENSOR SYSTEM

TECHNICAL FIELD

The presently disclosed subject matter relates to a lighting system and a sensor system that are adapted to be mounted on a vehicle.

BACKGROUND ART

In order to realize a self-driving technique of a vehicle, sensors for obtaining information of the outside of the vehicle shall be mounted on a vehicle body. As examples of such sensors, a camera and a LiDAR (Light Detection and Ranging) sensor are known (see Patent Document 1, for example). The LiDAR sensor is a device configured to emit non-visible light to obtain information as to distances to an object and information as to an attribute of the object based on the reflected light.

When a light source for lighting a predetermined area around a vehicle is mounted on a vehicle body, it is necessary to adjust a posture of the light source with respect to the vehicle body or a lighting reference position of the light source. Similarly, when the sensor is mounted on a vehicle body, it is necessary to adjust a posture of the sensor with respect to the vehicle body or a sensing reference position of the sensor. It is known that, by integrating the light source with the sensor, a single adjustment mechanism is used to collectively adjust the lighting reference position of the light source and the sensing reference position of the sensor (see Patent Document 2, for example).

PRIOR ART DOCUMENT

Patent Document

Patent Document 1: Japanese Patent Publication No. 2010-185769A
Patent Document 2: Japanese Patent Publication No. H05-027037A

SUMMARY

Technical Problem

In the technique described in Patent Document 2, since it is necessary to integrate the light source with the sensor in order to collectively adjust the lighting reference position of the light source and the sensing reference position of the sensor, the degree of freedom in layouts of the light source and the sensor is limited. Conversely, in order to secure the degree of freedom in layouts of the light source and the sensor, it is necessary to separately provide a mechanism for adjusting the lighting reference position of the light source and a mechanism for adjusting the sensing reference position of the sensor. As the number of adjustment mechanism increases, the burden of the adjustment operation is increased.

Therefore, it is demanded to reduce the burden of the posture adjustments of the light source and the sensor with respect to the vehicle body or adjusting the lighting reference position of the light source and the sensing reference position of the sensor while securing the degree of freedom in layouts of the light source and the sensor (the first demand).

When the sensor as described above is mounted on a vehicle body, it is necessary to adjust the posture of the sensor with respect to the vehicle body or the sensing reference position of the sensor. As the number of types of sensors increases, the burden of the adjustment operation is increased because the number of objects requiring adjustment increases.

Therefore, even if the type of sensor mounted on the vehicle increases, it is demanded to reduce the burden of adjusting the sensing reference position of each sensor (the second demand).

Solution to Problem

In order to satisfy the first demand described above, an illustrative aspect of the presently disclosed subject matter provides a lighting system adapted to be mounted on a vehicle, comprising:
 a light source configured to emit light for lighting a predetermined area;
 a sensor configured to sense information of an outside of the vehicle;
 a first adjuster configured to adjust posture of the light source; and
 a second adjuster configured to adjust posture of the sensor,
 wherein adjustment by one of the first adjuster and the second adjuster is performed on the basis of adjustment that has been performed by the other one of the first adjuster and the second adjuster.

With the above configuration, since the result of the posture adjustment of one of the light source and the sensor is reflected in the posture adjustment of the other, it is possible to reduce the burden of the work for adjusting the postures of the light source and the sensor with respect to the vehicle body while securing the degree of freedom in layouts of the light source and the sensor.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the posture adjustment of the light source and the posture adjustment of the sensor can be associated with each other, the light source and the sensor can be integrated in the lighting system. That is, it is possible to satisfy the above-mentioned demand.

The lighting system may be configured such that:
 the first adjuster includes a first screw mechanism;
 the second adjuster includes a second screw mechanism; and
 the lighting system comprises a flexible shaft configured to transmit an actuation with respect to one of the first screw mechanism and the second screw mechanism to the other one of the first screw mechanism and the second screw mechanism.

With the above configuration, information as to adjusted amount for one of the light source and the sensor is transmitted to the other of the light source and the sensor only with the mechanical components. Therefore, it is easy to secure operation reliability with respect to the first screw mechanism and the second screw mechanism, which are used relatively infrequently.

In this case, the lighting system may be configured such that at least one of the first screw mechanism and the second screw mechanism is coupled to the flexible shaft via a reduction gear mechanism.

With the above configuration, the adjusted amount by the first screw mechanism can be transmitted to the second screw mechanism at a predetermined ratio. That is, it is possible to provide arbitrariness on how to transmit the adjusted amount from one of the first screw mechanism and the second screw mechanism to the other.

Alternatively, the lighting system may be configured such that:
one of the first adjuster and the second adjuster includes a screw mechanism;
the other one of the first adjuster and the second adjuster includes an actuator;
the lighting system comprises a sensor configured to output a sensing signal corresponding to an actuation with respect to the screw mechanism; and
an actuation signal corresponding to the sensing signal is input to the actuator.

With the above configuration, the posture of the light source can be adjusted by using an actuator used to change the lighting range of the light source, for example. Therefore, as for the light source, a separate adjustment mechanism such as the first screw mechanism can be omitted. Similarly, the posture of the sensor can be adjusted by using an actuator used to change the sensing range of the sensor, for example. Therefore, as for the sensor, a separate adjustment mechanism such as the second screw mechanism can be omitted.

Alternatively, the lighting system may be configured such that:
the first adjuster includes a first actuator;
the second adjuster includes a second actuator; and
a signal corresponding to an actuation performed by one of the first actuator and the second actuator is input to the other one of the first actuator and the second actuator.

With the above configuration, according to the above-mentioned reasons, both the separate adjustment mechanism such as the first screw mechanism and the separate adjustment mechanism such as the second screw mechanism can be omitted.

The lighting system may be configured such that the light source is configured to emit light to form a pattern to be used to perform the adjustment by the one of the first adjuster and the second adjuster.

With the above configuration, the posture adjustments of the light source and the sensor with respect to the vehicle body can be easily carried out after the lighting system is mounted on the vehicle body.

In order to satisfy the first demand described above, an illustrative aspect of the presently disclosed subject matter provides a lighting system adapted to be mounted on a vehicle, comprising:
a light source configured to emit light for lighting a predetermined area; and
a sensor configured to sense information of an outside of the vehicle,
wherein adjustment of a lighting reference position of the light source and a sensing reference position of the sensor is performed on the basis of adjustment that has been performed by the other one of the lighting reference position and the sensing reference position.

With the above configuration, since the result of adjusting one of the lighting reference position of the light source and the sensing reference position of the sensor is reflected in the other reference position adjustment, it is possible to reduce the burden of the work for adjusting the lighting reference position of the light source and the sensing reference position of the sensor while securing the degree of freedom in layouts of the light source and the sensor.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the lighting reference position adjustment of the light source and the sensing reference position adjustment of the sensor can be associated with each other, the light source and the sensor can be integrated in the lighting system. That is, it is possible to satisfy the above-mentioned demand.

The lighting system may be configured such that the light source is configured to emit light to form a pattern to be used to perform the adjustment of the one of the lighting reference position and the sensing reference position.

With the above configuration, the adjustments of the lighting reference position of the light source and the sensing reference position of the sensor can be easily carried out after the lighting system is mounted on the vehicle body.

In order to satisfy the first demand described above, an illustrative aspect of the presently disclosed subject matter provides a lighting system adapted to be mounted on a vehicle, comprising:
a light source configured to emit light for lighting a predetermined area;
a sensor configured to sense information of an outside of the vehicle; and
a corrector configured to correct the information sensed by the sensor on the basis of information as to a lighting reference position of the light source.

With the above configuration, it is possible to omit a configuration for adjusting a sensing reference position of the sensor. Therefore, it is possible to reduce the burden of the work for adjusting the lighting reference position of the light source and the sensing reference position of the sensor while securing the degree of freedom in layouts of the light source and the sensor.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the lighting reference position adjustment of the light source and the sensing reference position adjustment of the sensor can be associated with each other, the light source and the sensor can be integrated in the lighting system. That is, it is possible to satisfy the above-mentioned demand.

Moreover, since the configuration for adjusting the sensing reference position of the sensor can be omitted, it is easy to suppress an increase in size of the structure. This facilitates the integration of the light source and the sensor into the lighting system.

The lighting system may be configured such that the light source is configured to emit light to form a pattern to be used to obtain the information as to the lighting reference position.

With the above configuration, the information as to the lighting reference position of the light source that is obtained after the lighting system is mounted on the vehicle body can be reflected in the correction performed by the corrector.

The lighting system according to each illustrative aspect for satisfying the first demand may be configured such that:
the light source is disposed so as to light at least a front-rear direction of the vehicle; and
the sensor is disposed so as to obtain information of at least on the left and on the right of the vehicle.

In order to obtain information as to the left and right sides of the vehicle, it is preferable that the sensor is disposed at a position facing the left and right sides of the vehicle body of the vehicle. In such a layout, it may be difficult to adjust the posture of the sensor due to structural reasons of the vehicle body. However, according to the above configuration, since the result of the adjustment of the posture or the lighting reference position of the light source is reflected in the adjustment of the posture or the sensing reference position of the sensor, the above-mentioned difficulty can be avoided.

In order to satisfy the second demand described above, an illustrative aspect of the presently disclosed subject matter provides a sensor system adapted to be mounted on a vehicle, comprising:
- a first sensor configured to sense information of an outside of the vehicle;
- a second sensor configured to sense information of the outside of the vehicle in a different manner from the first sensor; and
- a first adjuster configured to adjust posture of the first sensor,
- wherein adjustment of the posture of the first sensor by the first adjuster is performed on the basis of the information that has been sensed by the second sensor.

With the above configuration, since the posture of the first sensor is automatically adjusted on the basis of the information sensed by the second sensor, it is possible to reduce the burden of the work for adjusting the posture of the first sensor with respect to the vehicle body.

For example, in a case where the posture of the first sensor is adjusted by using an actuator used to change the sensing range of the first sensor, a separate adjustment mechanism such as an aiming screw mechanism can be omitted for the first sensor.

The sensor system may comprise: a light source configured to emit light for lighting a predetermined area; and a second adjuster configured to adjust posture of the light source. The sensor system may be configured such that adjustment of the posture of the light source by the second adjuster is performed on the basis of the information that has been sensed by the second sensor.

With the above configuration, since the posture of the light source is automatically adjusted on the basis of the information sensed by the second sensor, it is possible to reduce the burden of the work for adjusting the posture of the light source with respect to the vehicle body.

For example, in a case where the posture of the light source 78 is adjusted by using an actuator used to change the lighting range of the light source, a separate adjustment mechanism such as an aiming screw mechanism can be omitted for the light source.

From the viewpoint of efficiently obtaining information around the vehicle and from the viewpoint of design, it is desired to dispose a sensor for obtaining information of the outside of the vehicle at locations in the vicinity of lighting devices that are disposed at four corners of the vehicle. According to such a configuration, since the posture adjustment of the light source and the posture adjustment of the first sensor can be associated with each other through the second sensor, the light source can be integrated into the sensor system. That is, it is possible to satisfy the above-mentioned demand.

In order to satisfy the second demand described above, an illustrative aspect of the presently disclosed subject matter provides a sensor system adapted to be mounted on a vehicle, comprising:
- a first sensor configured to sense information of an outside of the vehicle;
- a second sensor configured to sense information of the outside of the vehicle in a different manner from the first sensor; and
- a first adjuster configured to adjust a sensing reference position of the first sensor,
- wherein adjustment of the sensing reference position of the first sensor by the first adjuster is performed on the basis of the information that has been sensed by the second sensor.

With the above configuration, since the sensing reference position of the first sensor is automatically adjusted on the basis of the information sensed by the second sensor, it is possible to reduce the burden of the work for adjusting the sensing reference position of the first sensor with respect to the vehicle body.

The sensor system may comprise a light source configured to emit light for lighting a predetermined area. The sensor system may be configured such that a lighting reference position of the light source is adjusted on the basis of the information that has been sensed by the second sensor.

With the above configuration, since the lighting reference position of the light source is automatically adjusted on the basis of the information sensed by the second sensor, it is possible to reduce the burden of the work for adjusting the lighting reference position of the light source with respect to the vehicle body.

From the viewpoint of efficiently obtaining information around the vehicle and from the viewpoint of design, it is desired to dispose a sensor for obtaining information of the outside of the vehicle at locations in the vicinity of lighting devices that are disposed at four corners of the vehicle. According to such a configuration, since the adjustment of the lighting reference position of the light source and the adjustment of the sensing reference position of the first sensor can be associated with each other through the second sensor, the light source can be integrated into the sensor system. That is, it is possible to satisfy the above-mentioned demand.

The sensor system according to each illustrative aspect for satisfying the second demand may be configured such that the first sensor and the second sensor are supported by a common support member.

In this case, the posture or the sensing reference position of the second sensor can be adjusted at the same time as the posture or the sensing reference position of the first sensor is adjusted. Therefore, in a case where plural kinds of sensors are mounted on the vehicle, the burden of the work for adjusting the sensing reference position of each sensor can be reduced.

In order to satisfy the second demand described above, an illustrative aspect of the presently disclosed subject matter provides a sensor system adapted to be mounted on a vehicle, comprising:
- a first sensor configured to sense information of an outside of the vehicle;
- a second sensor configured to sense information of the outside of the vehicle in a different manner from the first sensor; and
- a corrector configured to correct the information sensed by the first sensor on the basis of the information that has been sensed by the second sensor.

With the above configuration, since a configuration for adjusting a sensing reference position of the first sensor can be omitted, it is possible to reduce the burden of the work for adjusting the sensing reference position of the first sensor with respect to the vehicle body.

In addition, since the configuration for adjusting the sensing reference position of the first sensor can be omitted, it is easy to suppress an increase in size of the structure. This facilitates the integration of the first sensor and the second sensor into the sensor system.

The sensor system may comprise a light source configured to emit light for lighting a predetermined area. The sensor system may be configured such that a lighting reference position of the light source is adjusted on the basis of the information that has been sensed by the second sensor.

With the above configuration, since the lighting reference position of the light source is automatically adjusted on the basis of the information sensed by the second sensor, it is possible to reduce the burden of the work for adjusting the lighting reference position of the light source with respect to the vehicle body.

From the viewpoint of efficiently obtaining information around the vehicle and from the viewpoint of design, it is desired to dispose a sensor for obtaining information of the outside of the vehicle at locations in the vicinity of lighting devices that are disposed at four corners of the vehicle. With the above configuration, since the configuration for adjusting the sensing reference position of the first sensor can be omitted, it is easy to suppress an increase in size of the structure. Accordingly, it is possible to satisfy the above-mentioned demand.

The sensor system according to each illustrative aspect for satisfying the second demand may be configured such that the second sensor is a camera configured to capture an image of the outside of the vehicle.

With the above configuration, in a case where the positional deviation of the sensor constituting the sensor system with respect to the vehicle body is obtained as the information, such information can be obtained relatively easily on the basis of the image processing.

The sensor system according to each illustrative aspect for satisfying the second demand may be configured such that:
the first sensor is disposed so as to obtain information of at least on the left and on the right of the vehicle; and
the second sensor is disposed so as to obtain information of at least ahead of and behind the vehicle.

In order to obtain information as to the left and right sides of the vehicle, it is preferable that the first sensor is disposed at a position facing the left and right sides of the vehicle body of the vehicle. In such a layout, there would be a case where the adjustment of the posture of the first sensor is difficult due to structural reasons of the vehicle body. However, according to the above configuration, since the posture of the first sensor is automatically adjusted based on the positional deviation of the sensor system with respect to the vehicle body sensed through the second sensor, the above-described difficulty can be avoided.

DESCRIPTION OF EMBODIMENTS

Figure 1:
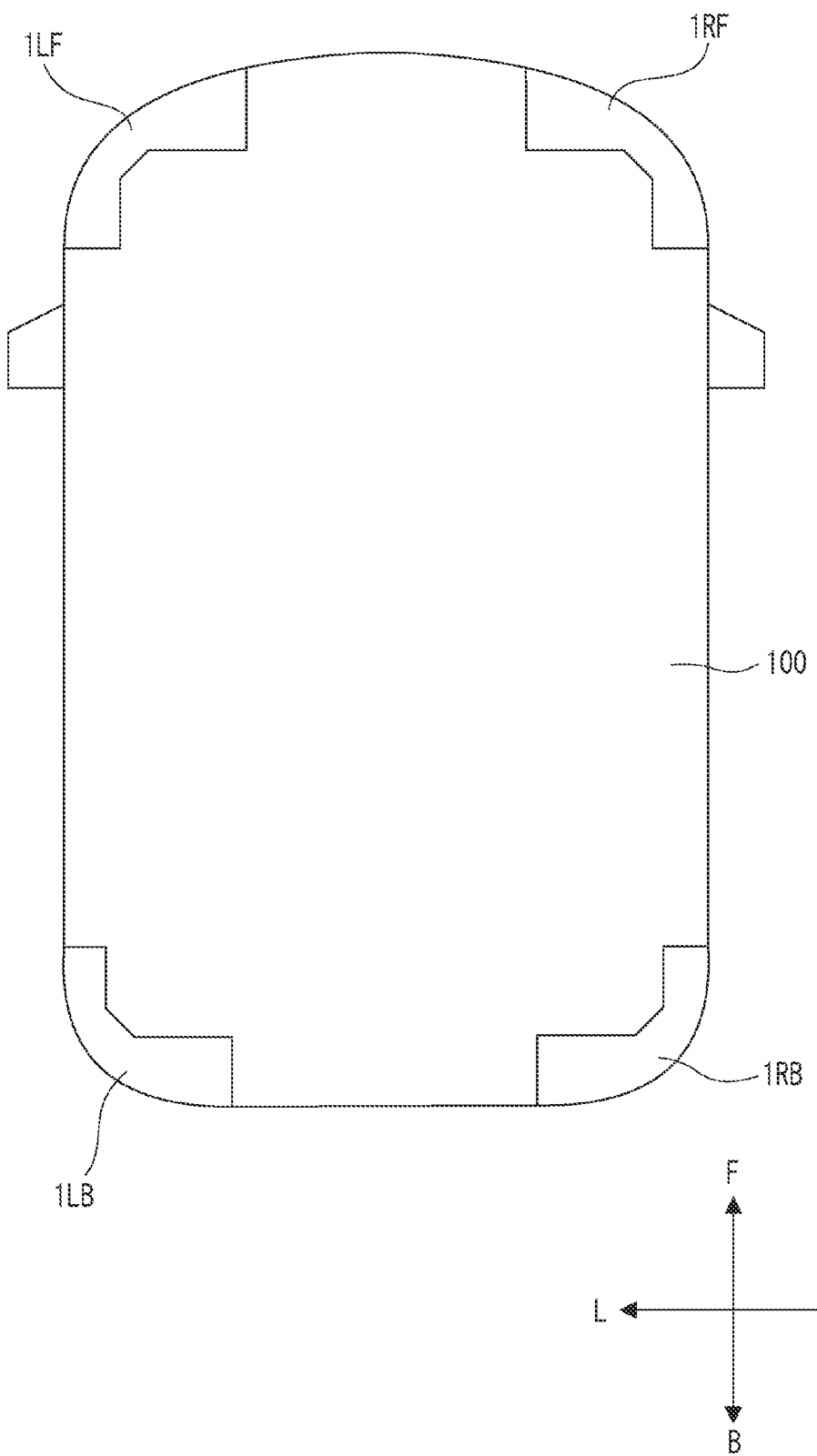
FIG. 1 illustrates a position of a lighting system on a vehicle.

Examples of embodiments will be described below in detail with reference to the accompanying drawings. In each of the drawings used in the following descriptions, the scale is appropriately changed in order to make each of the members have a recognizable size.

In the accompanying drawings, an arrow F represents a forward direction of the illustrated structure. An arrow B represents a rearward direction of the illustrated structure. An arrow L represents a leftward direction of the illustrated structure. An arrow R represents a rightward direction of the illustrated structure. The terms of "left" and "right" used in the following descriptions indicate the left-right directions as viewed from the driver's seat. In the accompanying drawings, the term "up-down direction" corresponds to the direction perpendicular to the drawing sheet.

As shown in FIG. 1, a left front lighting system 1LF according to a first embodiment is mounted on a left front corner of a vehicle 100. A right front lighting system 1RF according to the first embodiment is mounted on a right front corner of the vehicle 100.

Figure 2:
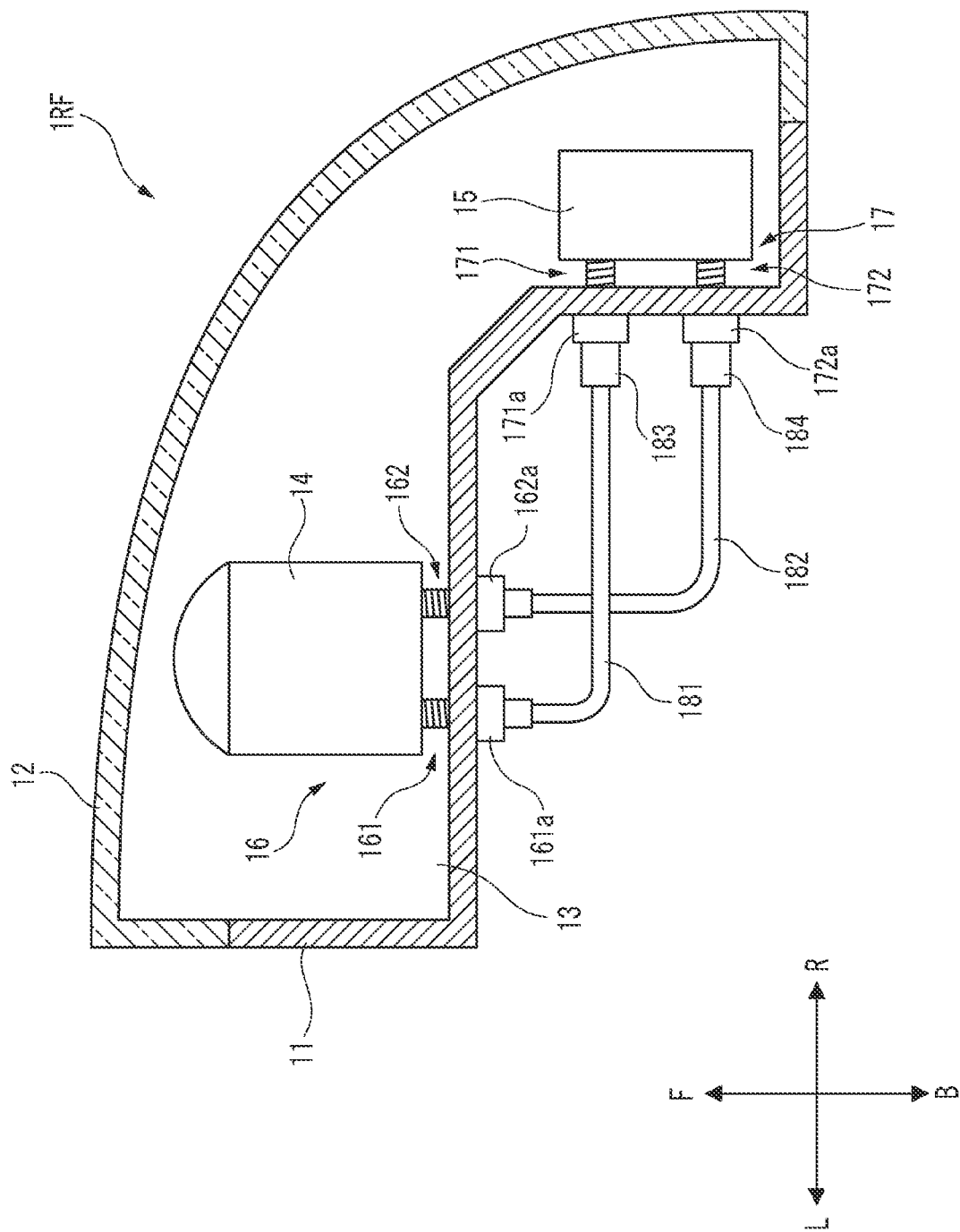
FIG. 2 illustrates a lighting system according to a first embodiment.

FIG. 2 schematically shows a configuration of the right front lighting system 1RF. Although not shown, the left front lighting system 1LF has a configuration symmetrical with the right front lighting system 1RF relative to the left-right direction.

The right front lighting system 1RF includes a housing 11 and a translucent cover 12. The housing 11 and the translucent cover 12 define a lamp chamber 13.

The right front lighting system 1RF includes a light source 14. The light source 14 includes an optical system including at least one of a lens and a reflector, and emits light for lighting a predetermined area. The light source 14 is disposed in the lamp chamber 13. As the light source 14, a lamp light source or a light emitting element can be used. Examples of a lamp light source include an incandescent lamp, a halogen lamp, a discharge lamp, and a neon lamp. Examples of the light emitting element include a light emitting diode, a laser diode, and an organic EL element.

The right front lighting system 1RF includes a LiDAR sensor 15. The LiDAR sensor 15 has a configuration for emitting non-visible light and a configuration for sensing returned light as a result of the non-visible light being reflected by an object existing outside the vehicle 100. That is, the LiDAR sensor 15 is a sensor for sensing information of the outside of the vehicle 100. As required, the LiDAR sensor 15 may include a scan device that sweeps the non-visible light to change the light emitting direction (i.e., the sensing direction). In the present embodiment, infrared light having a wavelength of 905 nm is used as the non-visible light.

The LiDAR sensor 15 can obtain the distance to the object associated with the returned light, for example, based on the time period from the time when the non-visible light is emitted in a certain direction to the time when the returned light is sensed. Further, by accumulating such distance data in association with the sensing position, it is possible to obtain information as to the shape of the object associated with the returned light. Additionally or alternatively, information as to an attribute such as the material of the object associated with the returned light can be obtained based on the difference in wavelength between the emitted light and the returned light. Additionally or alternatively, information about the color of the object, such as a white line on the road surface, can be obtained, for example, based on the difference in reflectivity of the returned light from the road surface.

The LiDAR sensor 15 outputs a signal corresponding to an attribute (intensity, wavelength or the like) of the sensed returned light. The above-mentioned information is obtained by appropriately processing signal output from the LiDAR sensor 15 by an information processor (not shown). The information processor may be provided in the right front lighting system 1RF or may be mounted on the vehicle 100.

The right front lighting system 1RF includes a first screw mechanism 16, which is an example of a first adjuster. The first screw mechanism 16 is a mechanism for adjusting the posture of the light source 14. Specifically, the first screw mechanism 16 includes a first horizontal adjusting screw 161 and a first vertical adjusting screw 162.

A first horizontal adjusting screw 161 extends through the housing 11. The first horizontal adjusting screw 161 is coupled to the light source 14 via a joint (not shown). A head portion 161*a* of the first horizontal adjusting screw 161 is disposed outside the housing 11. When the head portion 161*an* is rotated by a predetermined tool, the rotation of the first horizontal adjusting screw 161 is converted into a motion for changing the posture of the light source 14 in a horizontal plane (in a plane including the front-rear direction and the left-right direction in the drawing) by the joint. It should be noted that the "horizontal plane" used herein need not coincide with a strict horizontal plane. Since the construction itself of the joint is well known, detailed descriptions thereof will be omitted.

The first vertical adjusting screw 162 extends through the housing 11. The first vertical adjusting screw 162 is coupled to the light source 14 via a joint (not shown). The head portion 162*a* of the first vertical adjusting screw 162 is disposed outside the housing 11. When the head portion 162*an* is rotated by a predetermined tool, the rotation of the first vertical adjusting screw 162 is converted into a motion for changing the posture of the light source 14 in the vertical plane (in the plane including the left-right direction and the up-down direction in the drawing) by the joint. It should be noted that the "vertical plane" used herein need not coincide with a strict vertical plane. Since the construction itself of the joint is well known, detailed descriptions thereof will be omitted.

The right front lighting system 1RF includes a second screw mechanism 17, which is an example of a second adjuster. The second screw mechanism 17 is a mechanism for adjusting the posture of the LiDAR sensor 15. Specifically, the second screw mechanism 17 includes a second horizontal adjusting screw 171 and a second vertical adjusting screw 172.

The second horizontal adjusting screw 171 extends through the housing 11. The second horizontal adjusting screw 171 is coupled to the LiDAR sensor 15 via a joint (not shown). A head portion 171*a* of the second horizontal adjusting screw 171 is disposed outside the housing 11. When the head portion 171*an* is rotated by a predetermined tool, the rotation of the second horizontal adjusting screw 171 is converted into a motion for changing the posture of the LiDAR sensor 15 in a horizontal plane (in a plane including the front-rear direction and the left-right direction in the drawing) by the joint. It should be noted that the "horizontal plane" used herein need not coincide with a strict horizontal plane. Since the construction itself of the joint is well known, detailed descriptions thereof will be omitted.

A second vertical adjusting screw 172 extends through the housing 11. The second vertically adjusting screw 172 is coupled to the LiDAR sensor 15 via a joint (not shown). A head portion 172*a* of the second vertical adjusting screw 172 is disposed outside the housing 11. When the head portion 172*an* is rotated by a predetermined tool, the rotation of the second vertical adjusting screw 172 is converted into a motion for changing the posture of the LiDAR sensor 15 in the vertical plane (in the plane including the left-right direction and the up-down direction in the drawing) by the joint. It should be noted that the "vertical plane" used herein need not coincide with a strict vertical plane. Since the construction itself of the joint is well known, detailed descriptions thereof will be omitted.

The right front lighting system 1RF includes a horizontal adjusting flexible shaft 181. One end of the horizontal adjusting flexible shaft 181 is coupled to the head portion 161*a* of the first horizontal adjusting screw 161. The other end of the horizontal adjusting flexible shaft 181 is coupled to the head portion 171*a* of the second horizontal adjusting screw 171.

The coupling between the first horizontal adjusting screw 161 and the second horizontal adjusting screw 171 by the horizontal adjusting flexible shaft 181 is made after the horizontal posture adjustment of the light source 14 with respect to the housing 11 using the first horizontal adjusting screw 161 and the horizontal posture adjustment of the LiDAR sensor 15 with respect to the housing 11 using the second horizontal adjusting screw 171 are completed.

When the head portion 161*a* of the first horizontal adjusting screw 161 is rotated to adjust the posture of the light source 14 in the horizontal plane, the rotary actuation force is transmitted to the head portion 171*a* of the second horizontal adjusting screw 171 through the horizontal adjusting flexible shaft 181, so that the head portion 171*a* is rotated. As a result, the second horizontal adjusting screw 171 is rotated by an amount corresponding to the actuated amount of the first horizontal adjusting screw 161, so that the posture of the LiDAR sensor 15 in the horizontal plane is adjusted.

Conversely, when the head portion 171*a* of the second horizontal adjusting screw 171 is rotated to adjust the posture of the LiDAR sensor 15 in the horizontal plane, the rotary actuation force is transmitted to the head portion 161*a* of the first horizontal adjusting screw 161 through the horizontal adjusting flexible shaft 181, so that the head portion 161a*n* is rotated. As a result, the first horizontal adjusting screw 161 is rotated by an amount corresponding to the actuated amount of the second horizontal adjusting screw 171, so that the posture of the light source 14 in the horizontal plane is adjusted.

The right front lighting system 1RF includes a vertical adjusting flexible shaft 182. One end of the vertical adjusting flexible shaft 182 is coupled to the head portion 162a of the first vertical adjusting screw 162. The other end of the vertical adjusting flexible shaft 182 is coupled to the head portion 172a of the second vertical adjusting screw 172.

The coupling of the first vertical adjusting screw 162 and the second vertical adjusting screw 172 by the vertical adjusting flexible shaft 182 is made after the vertical posture adjustment of the light source 14 with respect to the housing 11 using the first vertical adjusting screw 162 and the vertical posture adjustment of the LiDAR sensor 15 with respect to the housing 11 using the second vertical adjusting screw 172 are completed.

When the head portion 162a of the first vertical adjusting screw 162 is rotated to adjust the posture of the light source 14 in the vertical plane, the rotary actuation force is transmitted to the head portion 172a of the second vertical adjusting screw 172 through the vertical adjusting flexible shaft 182, so that the head portion 172a*n* is rotated. As a result, the second vertical adjusting screw 172 is rotated by an amount corresponding to the actuated amount of the first vertical adjusting screw 162, so that the posture of the LiDAR sensor 15 in the vertical plane is adjusted.

Conversely, when the head portion 172a of the second vertical adjusting screw 172 is rotated to adjust the posture of the LiDAR sensor 15 in the vertical plane, the rotary actuation force is transmitted to the head portion 162a of the first vertical adjusting screw 162 through the vertical adjusting flexible shaft 182, so that the head portion 162a*n* is rotated. As a result, the first vertical adjusting screw 162 is rotated by an amount corresponding to the actuated amount of the second vertical adjusting screw 172, so that the posture of the light source 14 in the vertical plane is adjusted.

That is, in the right front lighting system 1RF, the adjustment by one of the first screw mechanism 16 and the second screw mechanism 17 is performed based on the adjustment performed by the other of the first screw mechanism 16 and the second screw mechanism 17.

According to such a configuration, since the result of the posture adjustment of one of the light source 14 and the LiDAR sensor 15 is reflected in the posture adjustment of the other, it is possible to reduce the burden of the work for adjusting the postures of the light source 14 and the LiDAR sensor 15 with respect to the vehicle body while securing the degree of freedom in layouts of the light source 14 and the LiDAR sensor 15.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the posture adjustment of the light source 14 and the posture adjustment of the LiDAR sensor 15 can be associated with each other, the light source 14 and the LiDAR sensor 15 can be integrated in the right front lighting system 1RF. That is, it is possible to satisfy the above-mentioned demand.

The actuation of one of the first screw mechanism 16 and the second screw mechanism 17 is transmitted to the other of the first screw mechanism 16 and the second screw mechanism 17 through the horizontal adjusting flexible shaft 181 and the vertical adjusting flexible shaft 182. In other words, information as to adjusted amount for one of the light source 14 and the LiDAR sensor 15 is transmitted to the other of the light source 14 and the LiDAR sensor 15 only with the mechanical components. Therefore, it is easy to secure operation reliability with respect to the first screw mechanism 16 and the second screw mechanism 17, which are used relatively infrequently.

In the present embodiment, the head portion 171a of the second horizontal adjusting screw 171 is coupled to the horizontal adjusting flexible shaft 181 via a horizontal adjusting reduction gear mechanism 183. The head portion 172a of the second vertical adjusting screw 172 is coupled to the vertical adjusting flexible shaft 182 via a vertical adjusting reduction gear mechanism 184.

According to such a configuration, the adjusted amount by the first horizontal adjusting screw 161 can be transmitted to the second horizontal adjusting screw 171 at a predetermined ratio. Similarly, the adjusted amount by the first vertical adjusting screw 162 can be transmitted to the second vertical adjusting screw 172 at a predetermined ratio. That is, it is possible to provide arbitrariness on how to transmit the adjusted amount from one of the first screw mechanism 16 and the second screw mechanism 17 to the other.

For example, the amount of change in the posture of the light source 14 by a certain adjusted amount of the first horizontal adjusting screw 161 and the amount of change in the posture of the LiDAR sensor 15 by the same adjusted amount of the second horizontal adjusting screw 171 may differ due to the difference in the dimensions or shapes of the light source 14 and the LiDAR sensor 15. The same applies to the first vertical adjusting screw 162 and the second vertical adjusting screw 172. According to the above configuration, by appropriately setting the reduction ratio of the horizontal adjusting reduction gear mechanism 183 and the vertical adjusting reduction gear mechanism 184, the amount of change in the posture of the light source 14 and the amount of change in the posture of the LiDAR sensor 15 can be matched as required.

Additionally or alternatively, the head portion 161a of the first horizontal adjusting screw 161 may be coupled to the horizontal adjusting flexible shaft 181 via a reduction gear mechanism. Additionally or alternatively, the head portion 162a of the first vertical adjusting screw 162 may be coupled to the vertical adjusting flexible shaft 182 via a reduction gear mechanism.

In the present embodiment, the light source 14 is arranged to light at least ahead of the vehicle 100 (an example of the front-rear direction of the vehicle), and the LiDAR sensor 15 is arranged to obtain information of at least on the right of the vehicle 100 (an example of the left-right direction of the vehicle).

In order to obtain information as to the right side of the vehicle 100, it is preferable that the LiDAR sensor 15 is disposed at a position facing the right side of the vehicle body of the vehicle 100. In such a layout, it may be difficult to adjust the posture of the LiDAR sensor 15 due to structural reasons of the vehicle body. However, according to the above configuration, since the result of the posture adjustment of the light source 14 is reflected in the posture adjustment of the LiDAR sensor 15, the above-mentioned difficulty can be avoided.

Figure 3:
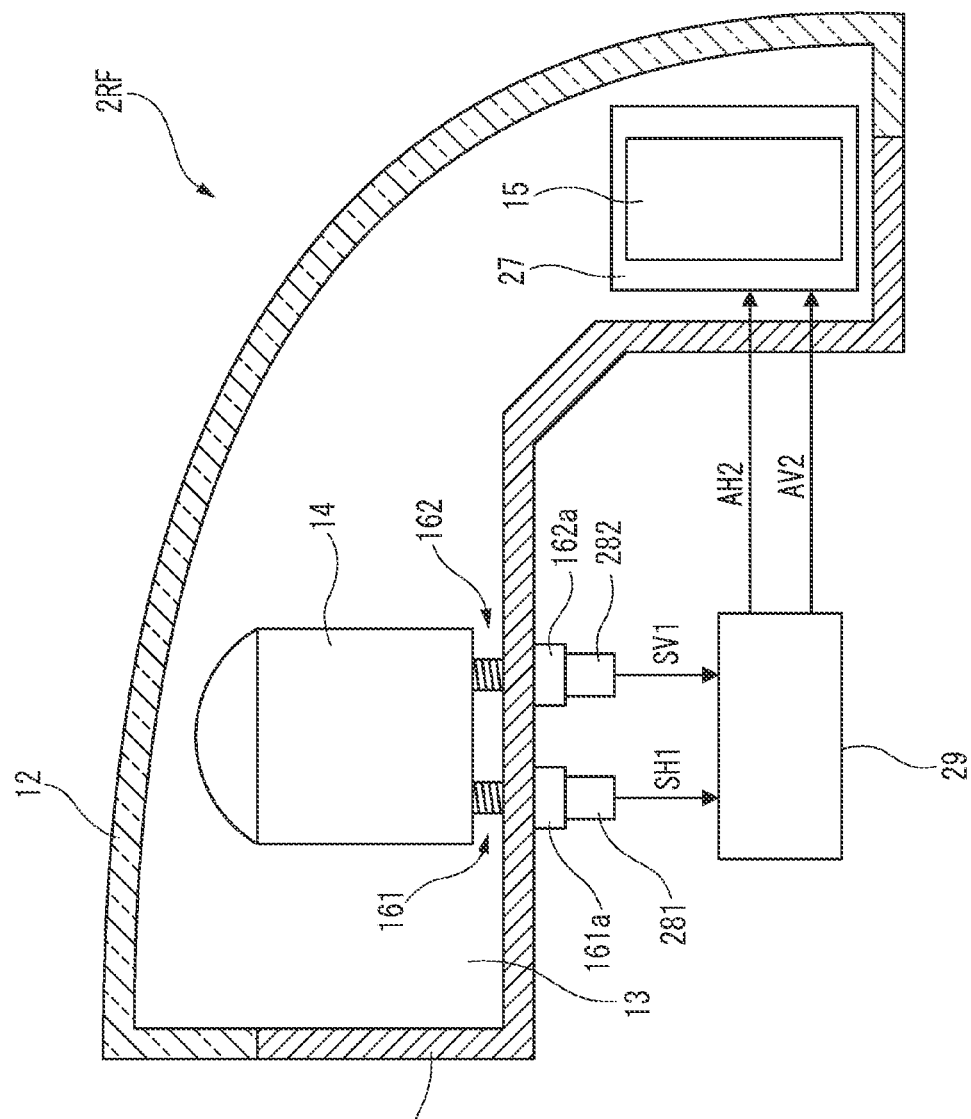
FIG. 3 illustrates a lighting system according to a second embodiment.

FIG. 3 schematically shows a configuration of a right front lighting system 2RF according to a second embodiment. Although not shown, a left front lighting system mounted on the left front corner of the vehicle 100 has a configuration symmetrical with the right front lighting system 2RF. Components that are the same as or equivalent to those of the right front lighting system 1RF according to the first embodiment are assigned with the same reference numerals, and repetitive descriptions for those will be omitted.

The right front lighting system 2RF includes a sensor actuator 27, which is an example of the second adjuster. The sensor actuator 27 is a device for adjusting the posture of the LiDAR sensor 15. At least a portion of the sensor actuator 27 is disposed in the lamp chamber 13 and is coupled to the LiDAR sensor 15.

The sensor actuator 27 is configured to change the posture of the LiDAR sensor 15 in a horizontal plane (in a plane including the front-rear direction and the left-right direction in the drawing) and in a vertical plane (in a plane including the left-right direction and the up-down direction in the drawing). Since the structure of such an actuator itself is well known, detailed descriptions thereof will be omitted.

The right front lighting system 2RF includes a horizontal adjusting sensor 281. The horizontal adjusting sensor 281 is configured to output a first horizontal sensing signal SH1 corresponding to the actuation of the first horizontal adjusting screw 161 in the first screw mechanism 16. The first horizontal sensing signal SH1 may indicate a change in the rotational angular position of the first horizontal adjusting screw 161, or may indicate the rotation amount of the first horizontal adjusting screw 161. Alternatively, the first horizontal sensing signal SH1 may indicate the posture or position in the horizontal direction of the light source 14, or may indicate the amount of change in the posture or position in the horizontal direction of the light source 14.

The right front lighting system 2RF includes a vertical adjusting sensor 282. The vertical adjusting sensor 282 is configured to output a first vertical sensing signal SV1 corresponding to the actuation of the first vertical adjusting screw 162 in the first screw mechanism 16. The first vertical sensing signal SV1 may indicate a change in the rotational angular position of the first vertical adjusting screw 162, or may indicate an amount of rotation of the first vertical adjusting screw 162. Alternatively, the first vertical sensing signal SV1 may indicate the posture or position in the vertical direction of the light source 14, or may indicate the amount of change in the posture or position in the vertical direction of the light source 14.

The right front lighting system 2RF includes a signal processor 29. The signal processor 29 may be realized as a function of an electronic control unit (ECU) mounted on the vehicle 100, or may be realized as a function of a control device (controller) disposed in the lamp chamber 13.

The signal processor 29 generates a second horizontal actuation signal AH2 based on the first horizontal sensing signal SH1 output from the horizontal adjusting sensor 281, and inputs the same into the sensor actuator 27. The second horizontal actuation signal AH2 has an attribute (voltage value, current value, frequency, etc.) corresponding to the adjusted amount of the posture of the LiDAR sensor 15 in the horizontal plane, which is determined based on the adjusted amount of the posture of the light source 14 in the horizontal plane sensed by the horizontal adjusting sensor 281.

The generation and output of the second horizontal actuation signal AH2 by the signal processor 29 are made after the horizontal posture adjustment of the light source 14 with respect to the housing 11 using the first horizontal adjusting screw 161 and the horizontal posture adjustment of the LiDAR sensor 15 with respect to the housing 11 using the sensor actuator 27 are completed.

In addition, the signal processor 29 generates the second vertical actuation signal AV2 based on the first vertical sensing signal SV1 output from the vertical adjusting sensor 282, and inputs the same to the sensor actuator 27. The second vertical adjusting signal AV2 has an attribute (voltage value, current value, frequency, etc.) corresponding to the adjusted amount of the posture of the LiDAR sensor 15 in the vertical plane, which is determined based on the adjusted amount of the posture of the light source 14 in the vertical plane sensed by the vertical adjusting sensor 282.

The generation and output of the second vertical adjusting signal AV2 by the signal processor 29 are made after the vertical posture adjustment of the light source 14 with respect to the housing 11 using the first vertical adjusting screw 162 and the vertical posture adjustment of the LiDAR sensor 15 with respect to the housing 11 using the sensor actuator 27 are completed.

Therefore, when the head portion 161a of the first horizontal adjusting screw 161 is rotated to adjust the posture of the light source 14 in the horizontal plane, the first horizontal sensing signal SH1 corresponding to the actuation is output from the horizontal adjusting sensor 281. The signal processor 29 inputs a second horizontal actuation signal AH2 corresponding to the first horizontal sensing signal SH1 to the sensor actuator 27. The sensor actuator 27 adjusts the posture of the LiDAR sensor 15 in the horizontal plane based on the second horizontal adjusting signal AH2.

Similarly, when the head portion 162a of the first vertical adjusting screw 162 is rotated to adjust the posture of the light source 14 in the vertical plane, a first vertical sensing signal SV1 corresponding to the actuation is output from the vertical adjusting sensor 282. The signal processor 29 inputs a second vertical actuation signal AV2 corresponding to the first vertical sensing signal SV1 to the sensor actuator 27. The sensor actuator 27 adjusts the posture of the LiDAR sensor 15 in the vertical plane based on the second vertical adjusting signal AV2.

That is, in the right front lighting system 2RF, the adjustment by the sensor actuator 27 is performed based on the adjustment performed by the first screw mechanism 16.

According to such a configuration, since the result of the posture adjustment of the light source 14 is reflected in the posture adjustment of the LiDAR sensor 15, it is possible to reduce the burden of the work for adjusting the postures of the light source 14 and the LiDAR sensor 15 with respect to the vehicle body while securing the degree of freedom in layouts of the light source 14 and the LiDAR sensor 15.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the posture adjustment of the light source 14 and the posture adjustment of the LiDAR sensor 15 can be associated with each other, the light source 14 and the LiDAR sensor 15 can be integrated in the right front lighting system 2RF. That is, it is possible to satisfy the above-mentioned demand.

The posture of the LiDAR sensor 15 is adjusted by the sensor actuator 27 coupled to the LiDAR sensor 15. According to such a configuration, for example, the posture of the LiDAR sensor 15 can be adjusted by using an actuator used to change the sensing range of the LiDAR sensor 15 in the horizontal plane and the sensing range in the vertical plane. In this instance, the posture adjustment corresponds to adjusting the sensing reference position of the LiDAR sensor 15. Therefore, as for the LiDAR sensor 15, a separate adjustment mechanism such as the second screw mechanism 17 in the first embodiment can be omitted.

In the present embodiment, the second horizontal actuation signal AH2 and the second vertical actuation signal AV2 respectively corresponding to the first horizontal sensing signal SH1 and the first vertical sensing signal SV1 are generated by the signal processor 29 and input to the sensor actuator 27. However, in a case where the first horizontal sensing signal SH1 and the first vertical sensing signal SV1 have specifications that can be used to control the operation of the sensor actuator 27, the first horizontal sensing signal SH1 and the first vertical sensing signal SV1 can be directly input to the sensor actuator 27 without passing through the signal processor 29.

In the present embodiment, the first horizontal sensing signal SH1 and the second horizontal actuation signal AH2 are associated in the one-by-one manner. Similarly, the first vertical sensing signal SV1 and the second vertical actuation signal AV2 are associated in the one-by-one manner. However, the first horizontal sensing signal SH1 may be associated with both the second horizontal actuation signal AH2 and the second vertical actuation signal AV2. Similarly, the first vertical sensing signal SV1 may be associated with both the second horizontal actuation signal AH2 and the second vertical actuation signal AV2. In this instance, for example, when the posture of the light source 14 in the horizontal plane is adjusted, both the posture adjustment in the horizontal plane and the posture adjustment in the vertical plane of the LiDAR sensor 15 on the basis of the above associations are performed.

Figure 4:
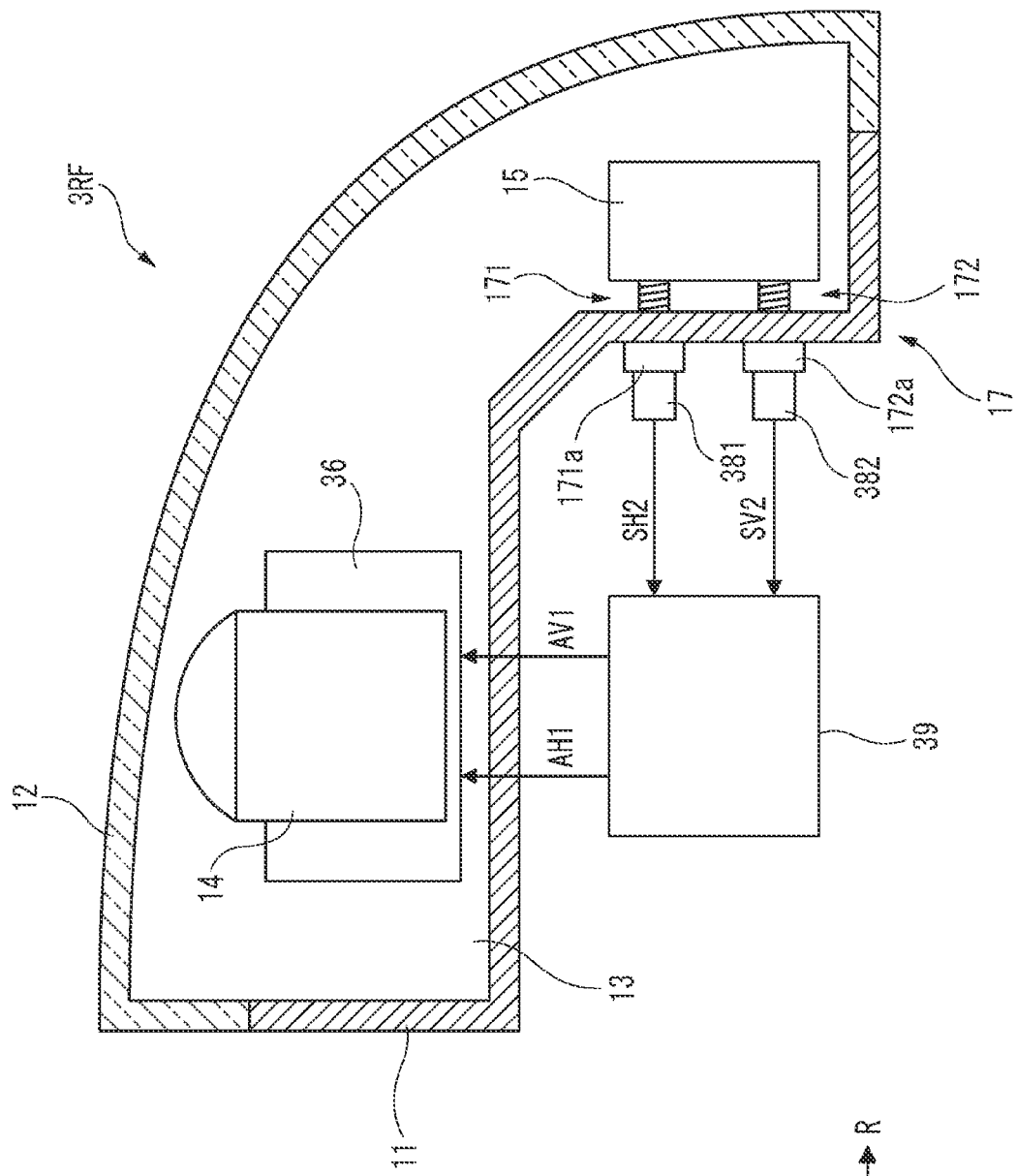
FIG. 4 illustrates a lighting system according to a third embodiment.

FIG. 4 schematically shows a configuration of a right front lighting system 3RF according to a third embodiment. Although not shown, a left front lighting system mounted on the left front corner of the vehicle 100 has a configuration symmetrical with the right front lighting system 3RF. Components that are the same as or equivalent to those of the right front lighting system 1RF according to the first embodiment are assigned with the same reference numerals, and repetitive descriptions for those will be omitted.

The right front lighting system 3RF includes a light source actuator 36, which is an example of the first adjuster. The light source actuator 36 is a device for adjusting the posture of the light source 14. At least a portion of the light source actuator 36 is disposed in the lamp chamber 13 and is coupled to the light source 14.

The light source actuator 36 is configured to change the posture of the light source 14 in a horizontal plane (in a plane including the front-rear direction and the left-right direction in the drawing) and in a vertical plane (in a plane including the front-rear direction and the up-down direction in the drawing). Since the structure of such an actuator itself is well known, detailed descriptions thereof will be omitted.

The right front lighting system 3RF includes a horizontal adjusting sensor 381. The horizontal adjusting sensor 381 is configured to output a second horizontal sensing signal SH2 corresponding to the actuation of the second horizontal adjusting screw 171 in the second screw mechanism 17. The second horizontal sensing signal SH2 may indicate a change in the rotational angular position of the second horizontal adjusting screw 171, or may indicate the rotation amount of the second horizontal adjusting screw 171. Alternatively, the second horizontal sensing signal SH2 may indicate the posture or position in the horizontal direction of the LiDAR sensor 15, or may indicate the amount of change in the posture or position in the horizontal direction of the LiDAR sensor 15.

The right front lighting system 3RF includes a vertical adjusting sensor 382. The vertical adjusting sensor 382 is configured to output a second vertical sensing signal SV2 corresponding to the actuation of the second vertical adjusting screw 172 in the second screw mechanism 17. The second vertical sensing signal SV2 may indicate a change in the rotational angular position of the second vertical adjusting screw 172, or may indicate the rotation amount of the second vertical adjusting screw 172. Alternatively, the second vertical sensing signal SV2 may indicate the posture or position in the vertical direction of the LiDAR sensor 15, or may indicate the amount of change in the posture or position in the vertical direction of the LiDAR sensor 15.

The right front lighting system 3RF includes a signal processor 39. The signal processor 39 may be realized as a function of an electronic control unit (ECU) mounted on the vehicle 100, or may be realized as a function of a control device (controller) disposed in the lamp chamber 13.

The signal processor 39 generates a first horizontal actuation signal AH1 based on the second horizontal sensing signal SH2 output from the horizontal adjusting sensor 381, and inputs the same to the light source actuator 36. The first horizontal actuation signal AH1 has an attribute (voltage value, current value, frequency, etc.) corresponding to the adjusted amount of the posture of the light source 14 in the horizontal plane determined based on the adjusted amount of the posture of the LiDAR sensor 15 in the horizontal plane sensed by the horizontal adjusting sensor 381.

The generation and output of the first horizontal actuation signal AH1 by the signal processor 39 are made after the horizontal posture adjustment of the light source 14 with respect to the housing 11 using the light source actuator 36 and the horizontal posture adjustment of the LiDAR sensor 15 with respect to the housing 11 using the second horizontal adjusting screw 171 are completed.

The signal processor 39 generates a first vertical actuation signal AV1 based on the second vertical sensing signal SV2 output from the vertical adjusting sensor 382, and inputs the same to the light source actuator 36. The first vertical adjusting signal AV1 have an attribute (voltages, currents, frequencies, etc.) corresponding to the adjusted amount of the posture of the light source 14 in the vertical plane, which is determined based on the adjusted amount of the posture of the LiDAR sensor 15 in the vertical plane sensed by the vertical adjusting sensor 382.

The generation and output of the first vertical actuation signal AV1 by the signal processor 39 are made after the vertical posture adjustment of the light source 14 with respect to the housing 11 using the light source actuator 36 and the vertical posture adjustment of the LiDAR sensor 15 with respect to the housing 11 using the second vertical adjusting screw 172 are completed.

Therefore, when the head portion 171a of the second horizontal adjusting screw 171 is rotated in order to adjust the posture of the LiDAR sensor 15 in the horizontal plane, the second horizontal sensing signal SH2 corresponding to the rotational actuation is output from the horizontal adjusting sensor 381. The signal processor 39 inputs the first horizontal actuation signal AH1 corresponding to the second horizontal sensing signal SH2 to the light source actuator 36. The light source actuator 36 adjusts the posture of the light source 14 in the horizontal plane based on the first horizontal actuation signal AH1.

On the other hand, when the head portion 172a of the second vertical adjusting screw 172 is rotated to adjust the posture of the LiDAR sensor 15 in the vertical plane, the second vertical sensing signal SV2 corresponding to the rotational actuation is output from the vertical adjusting sensor 382. The signal processor 39 inputs the first vertical actuation signal AV1 corresponding to the second vertical sensing signal SV2 to the light source actuator 36. The light source actuator 36 adjusts the posture of the light source 14 in the vertical plane based on the first vertical actuation signal AV1.

That is, in the right front lighting system 3RF, the adjustment by the light source actuator 36 is performed based on the adjustment performed by the second screw mechanism 17.

According to such a configuration, since the result of the posture adjustment of the LiDAR sensor 15 is reflected in the posture adjustment of the light source 14, it is possible to reduce the burden of the work for adjusting the postures of the light source 14 and the LiDAR sensor 15 with respect to the vehicle body while securing the degree of freedom in layouts of the light source 14 and the LiDAR sensor 15.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the posture adjustment of the light source 14 and the posture adjustment of the LiDAR sensor 15 can be associated with each other, the light source 14 and the LiDAR sensor 15 can be integrated in the right front lighting system 3RF. That is, it is possible to satisfy the above-mentioned demand.

The posture of the light source 14 is adjusted by the light source actuator 36 coupled to the light source 14. According to such a configuration, for example, the posture of the light source 14 can be adjusted by using an actuator used to change the lighting range of the light source 14 in the horizontal plane and the vertical plane. In this case, the posture adjustment corresponds to adjusting the reference position in the light emitting direction of the light source 14. Therefore, as for the light source 14, a separate adjustment mechanism such as the first screw mechanism 16 in the first embodiment can be omitted.

In the present embodiment, the first horizontal actuation signal AH1 and the first vertical actuation signal AV1 corresponding to the second horizontal sensing signal SH2 and the second vertical sensing signal SV2 are generated by the signal processor 39 and input to the light source actuator 36. However, in a case where the second horizontal sensing signal SH2 and the second vertical sensing signal SV2 have specifications that can be used to control the actuation of the light source actuator 36, the second horizontal sensing signal SH2 and the second vertical sensing signal SV2 can be directly input to the light source actuator 36 without passing through the signal processor 39.

In the present embodiment, the second horizontal sensing signal SH2 and the first horizontal actuation signal AH1 are associated in the one-by-one manner. Similarly, the second vertical sensing signal SV2 and the first vertical actuation signal AV1 are associated in the one-by-one manner. However, the second horizontal sensing signal SH2 may be associated with both the first horizontal actuation signal AH1 and the first vertical actuation signal AV1. Similarly, the second vertical sensing signal SV2 may be associated with both the first horizontal actuation signal AH1 and the first vertical actuation signal AV1. For example, when the posture adjustment in the horizontal plane of the LiDAR sensor 15 is performed, both the posture adjustment in the horizontal plane and the posture adjustment in the vertical plane of the light source 14 on the basis of the above associations are performed.

Figure 5:
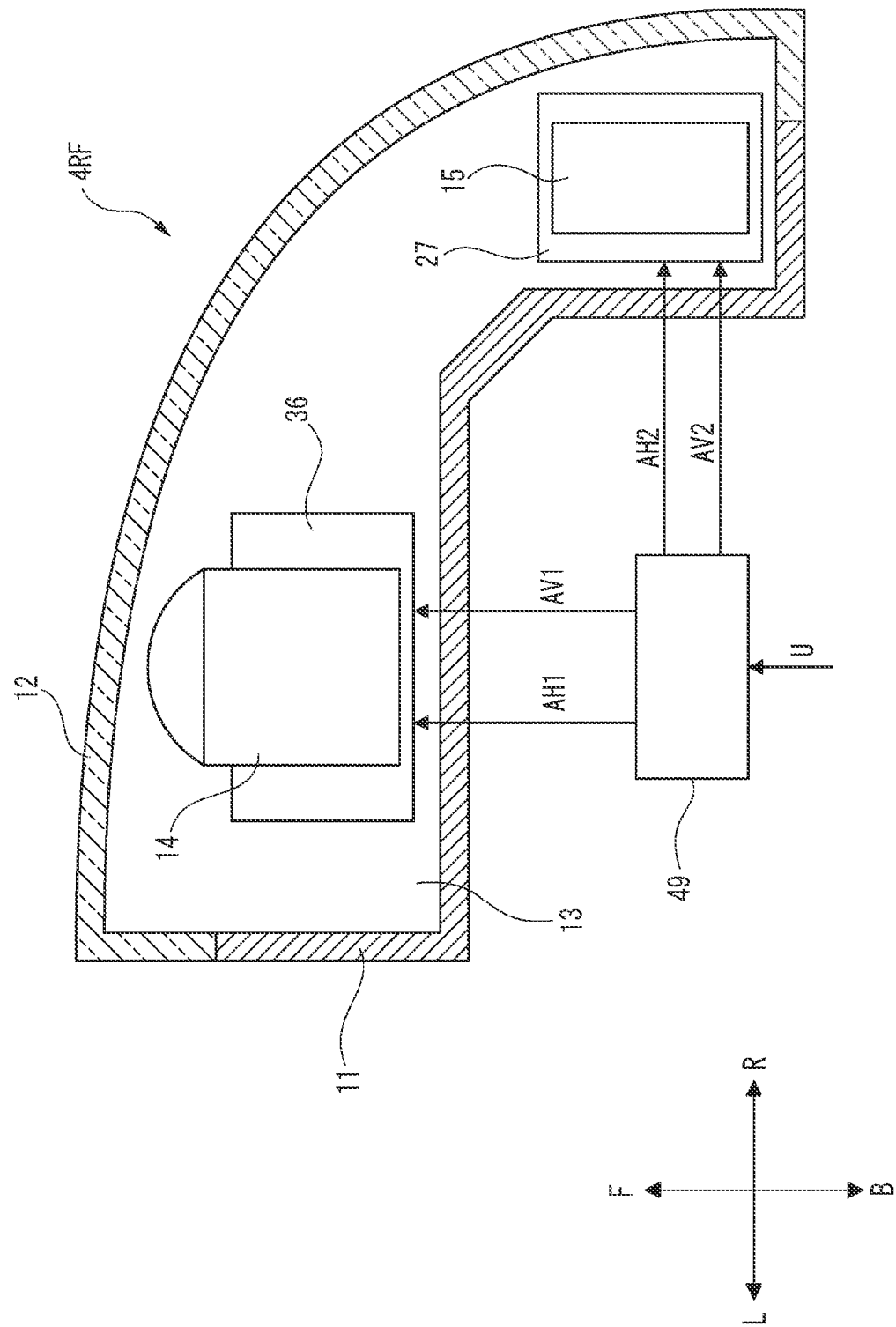
FIG. 5 illustrates a lighting system according to a fourth embodiment.

FIG. 5 schematically shows a configuration of a right front lighting system 4RF according to a fourth embodiment. Although not shown, a left front lighting system mounted on the left front corner of the vehicle 100 has a configuration symmetrical with the right front lighting system 4RF. Components that are the same as or equivalent to those of the right front lighting system 2RF according to the second embodiment and the right front lighting system 3RF according to the third embodiment are assigned with the same reference numerals, and repetitive descriptions for those will be omitted.

The right front lighting system 4RF includes a signal processor 49. The signal processor 49 may be realized as a function of an electronic control unit (ECU) mounted on the vehicle 100, or may be realized as a function of a control device (controller) disposed in the lamp chamber 13.

The signal processor 49 is configured to generate a first horizontal actuation signal AH1 and a first vertical actuation signal AV1 based on a user input signal U, and input the same to the light source actuator 36 (one example of a first actuator). The first horizontal actuation signal AH1 has an attribute (voltage value, current value, frequency, etc.) corresponding to the adjusted amount of the posture of the light source 14 in the horizontal plane. The first vertical actuation signal AV1 has an attribute (voltage value, current value, frequency, etc.) corresponding to the adjusted amount of the posture of the light source 14 in the vertical plane.

The generation and output of the first horizontal actuation signal AH1 and the first vertical actuation signal AV1 by the signal processor 49 are made after the posture adjustments of the light source 14 in the horizontal and vertical directions with respect to the housing 11 using the light source actuator 36 is completed.

On the other hand, the signal processor 49 is configured to generate a second horizontal actuation signal AH2 and a second vertical actuation signal AV2 based on the user input signal U, and input the same to the sensor actuator 27 (one example of a second actuator). The first horizontal actuation signal AH2 has an attribute (voltage value, current value, frequency, etc.) corresponding to the adjusted amount of the posture of the LiDAR sensor 15 in the horizontal plane. The second vertical actuation signal AV2 have an attribute (voltage value, current value, frequency, etc.) corresponding to the adjusted amount of the posture of the LiDAR sensor 15 in the vertical plane.

The generation and output of the second horizontal actuation signal AH2 and the second vertical actuation signal AV2 by the signal processor 49 are made after the posture adjustments of the LiDAR sensor 15 in the horizontal and vertical directions with respect to the housing 11 using the sensor actuator 27 is completed.

In the signal processor 49, the first horizontal actuation signal AH1 and the second horizontal actuation signal AH2 are associated with each other based on a predetermined relationship. Similarly, the first vertical actuation signal AV1 and the second vertical actuation signal AV2 are associated with each other based on a predetermined relationship.

When the first horizontal actuation signal AH1 is output to the light source actuator 36 in order to adjust the posture of the light source 14 in the horizontal plane, the second horizontal actuation signal AH2 based on the predetermined relationship is output to the sensor actuator 27. Conversely, when the second horizontal actuation signal AH2 is output to the sensor actuator 27, the first horizontal actuation signal AH1 based on the predetermined relationship is output to the light source actuator 36. The light source actuator 36 adjusts the posture of the light source 14 in the horizontal plane based on the first horizontal actuation signal AH1. The sensor actuator 27 adjusts the posture of the LiDAR sensor 15 in the horizontal plane based on the second horizontal adjusting signal AH2.

Similarly, when the first vertical actuation signal AV1 is output to the light source actuator 36 in order to adjust the posture of the light source 14 in the vertical plane, the second vertical actuation signal AV2 based on the predetermined relationship is output to the sensor actuator 27. Conversely, when the second vertical actuation signal AV2 is output to the sensor actuator 27, the first vertical actuation signal AV1 based on the predetermined relationship is output to the light source actuator 36. The light source actuator 36 adjusts the posture of the light source 14 in the vertical plane based on the first vertical actuation signal AV1. The sensor actuator 27 adjusts the posture of the LiDAR sensor 15 in the vertical plane based on the second vertical adjusting signal AV2.

That is, a signal corresponding to the adjustment by one of the light source actuator 36 and the sensor actuator 27 is input to the other of the light source actuator 36 and the sensor actuator 27. In other words, the adjustment by one of the light source actuator 36 and the sensor actuator 27 is performed based on the adjustment performed by the other of the light source actuator 36 and the sensor actuator 27.

According to such a configuration, since the result of the posture adjustment of one of the light source 14 and the LiDAR sensor 15 is reflected in the posture adjustment of the other, it is possible to reduce the burden of the work for adjusting the postures of the light source 14 and the LiDAR sensor 15 with respect to the vehicle body while securing the degree of freedom in layouts of the light source 14 and the LiDAR sensor 15.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the posture adjustment of the light source 14 and the posture adjustment of the LiDAR sensor 15 can be associated with each other, the light source 14 and the LiDAR sensor 15 can be integrated in the right front lighting system 4RF. That is, it is possible to satisfy the above-mentioned demand.

The posture of the light source 14 is adjusted by the light source actuator 36 coupled to the light source 14. According to such a configuration, for example, the posture of the light source 14 can be adjusted by using an actuator used to change the lighting range of the light source 14 in the horizontal plane and the vertical plane. In this case, the posture adjustment corresponds to adjusting the lighting reference position of the light source 14. Therefore, as for the light source 14, a separate adjustment mechanism such as the first screw mechanism 16 in the first embodiment can be omitted.

The posture of the LiDAR sensor 15 is adjusted by the sensor actuator 27 coupled to the LiDAR sensor 15. According to such a configuration, for example, the posture of the LiDAR sensor 15 can be adjusted by using an actuator used to change the sensing range of the LiDAR sensor 15 in the horizontal plane and the sensing range in the vertical plane. In this instance, the posture adjustment corresponds to adjusting the sensing reference position of the LiDAR sensor 15. Therefore, as for the LiDAR sensor 15, a separate adjustment mechanism such as the second screw mechanism 17 in the first embodiment can be omitted.

In the present embodiment, the first horizontal actuation signal AH1 and the second horizontal actuation signal AH2 are associated in the one-by-one manner. Similarly, the first vertical actuation signal AV1 and the second vertical actuation signal AV2 are associated in the one-by-one manner. However, the first horizontal actuation signal AH1 may be associated with both the second horizontal actuation signal AH2 and the second vertical actuation signal AV2. Similarly, the first vertical actuation signal AV1 may be associated with both the second horizontal actuation signal AH2 and the second vertical actuation signal AV2. In this instance, for example, when the posture of the light source 14 in the horizontal plane is adjusted, both the posture adjustment in the horizontal plane and the posture adjustment in the vertical plane of the LiDAR sensor 15 on the basis of the above associations are performed.

Conversely, the second horizontal actuation signal AH2 may be associated with both the first horizontal actuation signal AH1 and the first vertical actuation signal AV1. Similarly, the second vertical actuation signal AV2 may be associated with both the first horizontal actuation signal AH1 and the first vertical actuation signal AV1.

Figure 6:
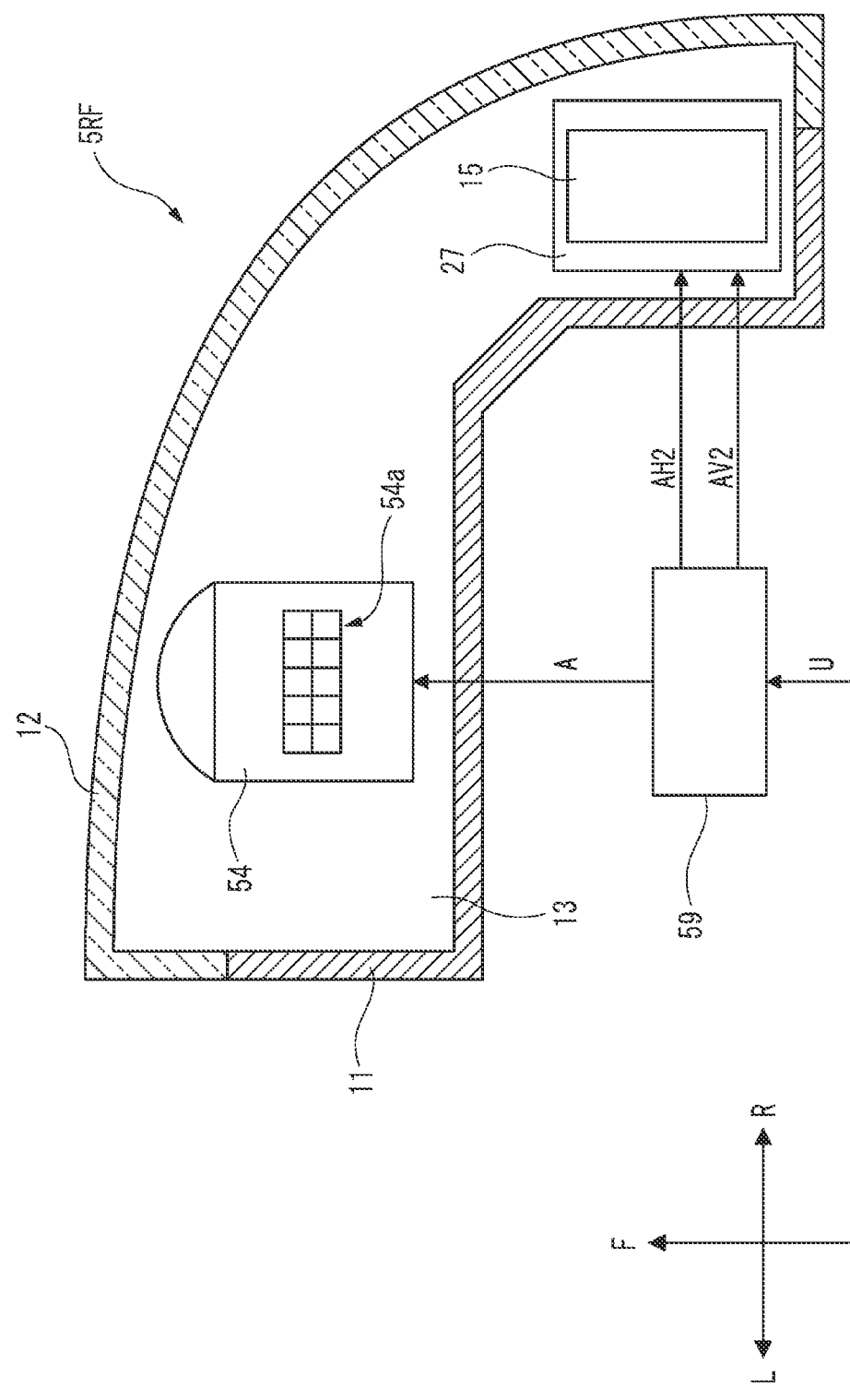
FIG. 6 illustrates a lighting system according to a fifth embodiment.

FIG. 6 schematically shows a configuration of a right front lighting system 5RF according to a fifth embodiment. Although not shown, a left front lighting system mounted on the left front corner of the vehicle 100 has a configuration symmetrical with the right front lighting system 5RF. Components that are the same as or equivalent to those of the right front lighting system 4RF according to the fourth embodiment are assigned with the same reference numerals, and repetitive descriptions for those will be omitted.

The right front lighting system 5RF includes a light source 54. The light source 54 includes a plurality of light emitting elements 54a two-dimensionally arranged in addition to an optical system including at least one of a lens and a reflector. Examples of the light emitting element include a light emitting diode, a laser diode, and an organic EL element. Each of the light emitting elements 54a can be turned on and off individually, and a predetermined area is lighted by light emitted from the turned-on light emitting element 54a.

In the present embodiment, at least one of the lighting reference position and the lighting range can be moved in at least one of the up-down direction and the left-right direction by appropriately changing the light emitting element 54a to be turned on and the light emitting element 54a to be turned off. It should be noted that the "up-down direction" used herein does not necessarily have to coincide with the vertical direction or the up-down direction of the vehicle 100. Similarly, the "left-right direction" used herein does not necessarily have to coincide with the horizontal direction or the left-right direction of the vehicle 100.

The light emitted from the light source may be deflected in a desired direction and at least one of the lighting reference position and the lighting range may be moved in at least one of the up-down direction and the left-right direction by using a MEMS mechanism or a scan mechanism instead of the above-described configuration.

The right front lighting system 5RF includes a signal processor 59. The signal processor 59 may be realized as a function of an electronic control unit (ECU) mounted on the vehicle 100, or may be realized as a function of a control device (controller) disposed in the lamp chamber 13.

The signal processor 59 is configured to generate an adjustment signal A based on the user input signal U and input the same to the light source 54. The adjustment signal A includes information for adjusting the lighting reference position of the light source 54 in at least one of the up-down direction and the left-right direction. More concretely, it contains information for determining the light emitting elements 54a to be turned on and the light emitting elements 54a to be turned off, so that the lighting reference position moves at least one of the up-down direction and the left-right direction.

The generation and output of the adjustment signal A by the signal processor 59 are made after the adjustment of the lighting reference position of the light source 54 with respect to the housing 11 is completed.

On the other hand, the signal processor 59 is configured to generate a second horizontal actuation signal AH2 and a second vertical actuation signal AV2 based on the user input signal U, and input the same to the sensor actuator 27. The first horizontal actuation signal AH2 has an attribute (voltage value, current value, frequency, etc.) corresponding to the adjusted amount of the posture of the LiDAR sensor 15 in the horizontal plane. The second vertical actuation signal AV2 have an attribute (voltage value, current value, frequency, etc.) corresponding to the adjusted amount of the posture of the LiDAR sensor 15 in the vertical plane.

The generation and output of the second horizontal actuation signal AH2 and the second vertical actuation signal AV2 by the signal processor 59 are made after the horizontal and vertical posture adjustments of the LiDAR sensor 15 with respect to the housing 11 using the sensor actuator 27 is completed.

In the signal processor 59, the adjustment signal A is associated with the second horizontal actuation signal AH2 and the second vertical actuation signal AV2 based on a predetermined relationship.

When the adjustment signal A is output to the light source 54 to adjust the lighting reference position of the light source 54, at least one of the second horizontal actuation signal AH2 and the second vertical actuation signal AV2 based on the predetermined relationship is output to the sensor actuator 27. Conversely, when the second horizontal actuation signal AH2 and the second vertical actuation signal AV2 are output to the sensor actuator 27, the adjustment signal A based on the predetermined relationship is output to the light source 54. The lighting reference position of the light source 54 is adjusted based on the adjustment signal A. The sensor actuator 27 adjusts at least one of the posture in the horizontal plane and the posture in the vertical plane of the LiDAR sensor 15 based on at least one of the second horizontal actuation signal AH2 and the second vertical actuation signal AV2. For example, the sensor actuator 27 adjusts the sensing reference position of the LiDAR sensor 15.

That is, the adjustment of one of the lighting reference position of the light source 54 and the sensing reference position of the LiDAR sensor 15 is performed based on the adjustment performed on the other of the lighting reference position of the light source 54 and the sensing reference position of the LiDAR sensor 15.

According to such a configuration, since the result of adjusting one of the lighting reference position of the light source 54 and the sensing reference position of the LiDAR sensor 15 is reflected in the other reference position adjustment, it is possible to reduce the burden of the work for adjusting the lighting reference position of the light source 54 and the sensing reference position of the LiDAR sensor 15 while securing the degree of freedom in layouts of the light source 54 and the LiDAR sensor 15.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the lighting reference position adjustment of the light source 54 and the sensing reference position adjustment of the LiDAR sensor 15 can be associated with each other, the light source 54 and the LiDAR sensor 15 can be integrated in the right front lighting system 5RF. That is, it is possible to satisfy the above-mentioned demand.

In addition, since the lighting reference position of the light source 54 is adjusted without using a mechanical component, it is easy to suppress an increase in size of the structure. This facilitates the integration of the light source 54 and the LiDAR sensor 15 into the right front lighting system 5RF.

In the present embodiment, the light source 54 is arranged to light at least ahead of the vehicle 100 (an example of the front-rear direction of the vehicle), and the LiDAR sensor 15 is arranged to obtain information of at least on the right of the vehicle 100 (an example of the left-right direction of the vehicle).

In order to obtain information as to the right side of the vehicle 100, it is preferable that the LiDAR sensor 15 is disposed at a position facing the right side of the vehicle body of the vehicle 100. In such a layout, there would be a case where the adjustment of the sensing reference position of the LiDAR sensor 15 is difficult due to structural reasons of the vehicle body. However, according to the above configuration, since the result of adjusting the lighting reference position of the light source 54 is reflected in the adjustment of the sensing reference position of the LiDAR sensor 15, the above-mentioned difficulty can be avoided.

With the configuration of the light source 54 described with reference to this embodiment, the light source 14 of the right front lighting system 3RF according to the third embodiment described with reference to FIG. 4 can be replaced.

Figure 7:
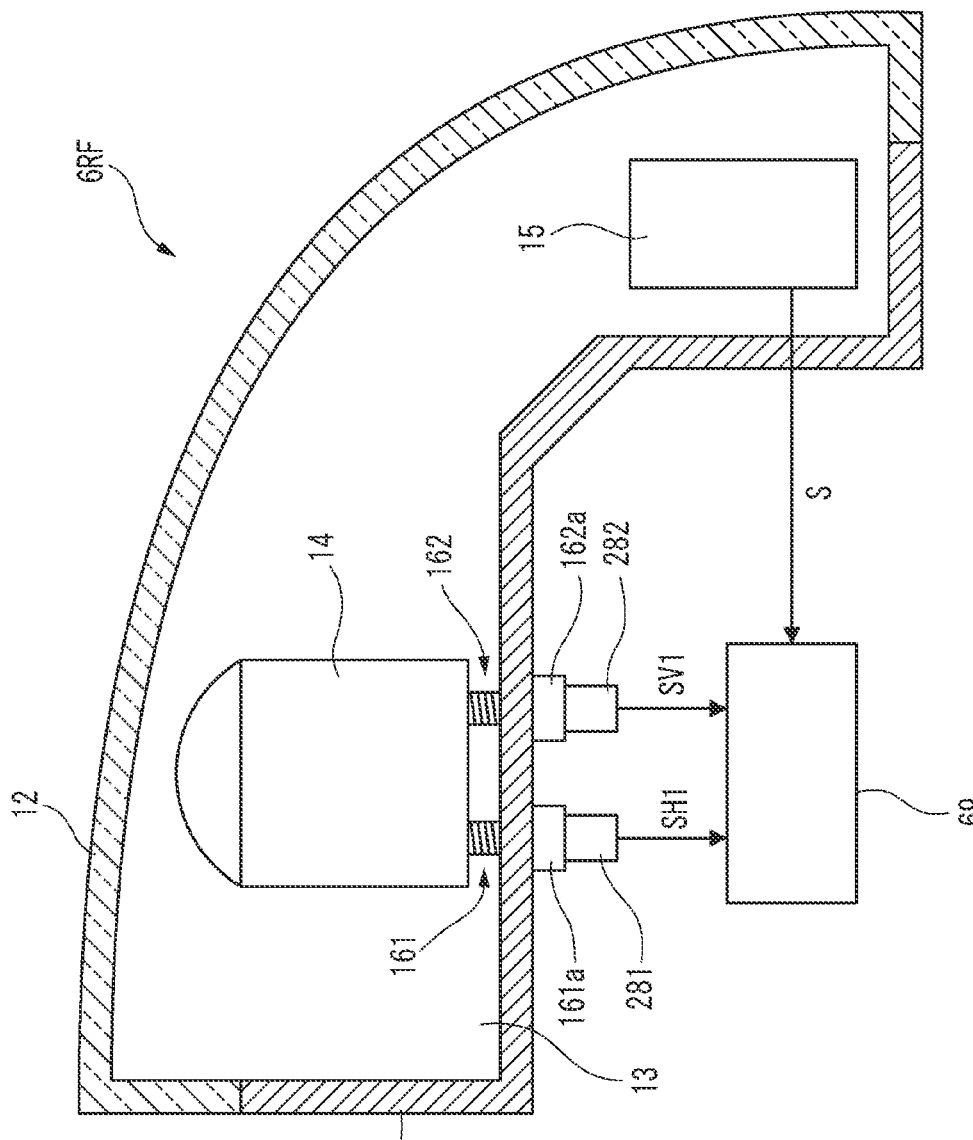
FIG. 7 illustrates a lighting system according to a sixth embodiment.

FIG. 7 schematically shows a configuration of a right front lighting system 6RF according to a sixth embodiment. Although not shown, a left front lighting system mounted on the left front corner of the vehicle 100 has a configuration symmetrical with the right front lighting system 6RF. Components that are the same as or equivalent to those of the right front lighting system 2RF according to the second embodiment are assigned with the same reference numerals, and repetitive descriptions for those will be omitted.

The right front lighting system 6RF includes a signal processor 69, which is an example of a corrector. The signal processor 69 may be realized as a function of an electronic control unit (ECU) mounted on the vehicle 100, or may be realized as a function of a control device (controller) disposed in the lamp chamber 13.

After the lighting reference position of the light source 14 with respect to the housing 11 is adjusted using the first horizontal adjusting screw 161 and the first vertical adjusting screw 162, the signal processor 69 is configured to obtain information as to the lighting reference position of the light source 14 with respect to the vehicle body based on the first horizontal sensing signal SH1 output from the horizontal adjusting sensor 281 and the first vertical sensing signal SV1 output from the vertical adjusting sensor 282. Specifically, the posture of the light source 14 with respect to the vehicle body can be recognized based on the first horizontal sensing signal SH1 and the first vertical sensing signal SV1. Based on this posture, the current lighting reference position or the amount of movement from the initial lighting reference position can be recognized.

As described above, the LiDAR sensor 15 outputs a sensing signal S corresponding to an attribute of the sensed returned light (intensity, wavelength or the like). The signal processor 69 is configured to receive the sensing signal S, and to correct information obtained from the signal based on information as to the lighting reference position of the light source 14 with respect to the vehicle body. The correction may be performed on the sensing signal S itself, or may be performed on another signal or data corresponding to the sensing signal S.

In the present embodiment, there is no mechanism for adjusting the posture of the LiDAR sensor 15, i.e., the sensing reference position. Therefore, when the lighting reference position of the light source 14 is changed, the sensing reference position of the LiDAR sensor 15 is not changed so as to correspond to the change, but the information obtained from the LiDAR sensor 15 is corrected. Specifically, the information obtained from the LiDAR sensor 15 is corrected to information that would have been obtained if the sensing reference position of the LiDAR sensor 15 was changed so as to correspond to the change of the lighting reference position of the light source 14. As a result, it is possible to obtain substantially the same information as the information obtained when the sensing reference position of the LiDAR sensor 15 is changed so as to correspond to the change of the lighting reference position of the light source 14.

The signal processor 69 stores in advance a table indicating a correspondence between the change of the lighting reference position of the light source 14 (including the change direction and the change amount as information) and the correction to be performed with respect to the information obtained from the LiDAR sensor 15. The signal processor 69 executes the above-described correction processing while referring to the table.

According to such a configuration, since the configuration for adjusting the sensing reference position of the LiDAR sensor 15 can be omitted, it is possible to reduce the burden of the work for adjusting the lighting reference position of the light source 14 and the sensing reference position of the LiDAR sensor 15 while securing the degree of freedom in layouts of the light source 14 and the LiDAR sensor 15.

In addition, from the viewpoint of efficiently obtaining information around the vehicle and from the viewpoint of design, it is desired to include a sensor for obtaining information outside the vehicle in a lighting system disposed at four corners of the vehicle. According to such a configuration, since the posture adjustment of the light source 14 and the posture adjustment of the LiDAR sensor 15 can be associated with each other, the light source 14 and the LiDAR sensor 15 can be integrated in the right front lighting system 6RF. That is, it is possible to satisfy the above-mentioned demand.

In addition, since the configuration for adjusting the sensing reference position of the LiDAR sensor 15 can be omitted, it is easy to suppress an increase in size of the structure. This facilitates the integration of the light source 14 and the LiDAR sensor 15 into the right front lighting system 6RF.

Figure 8:
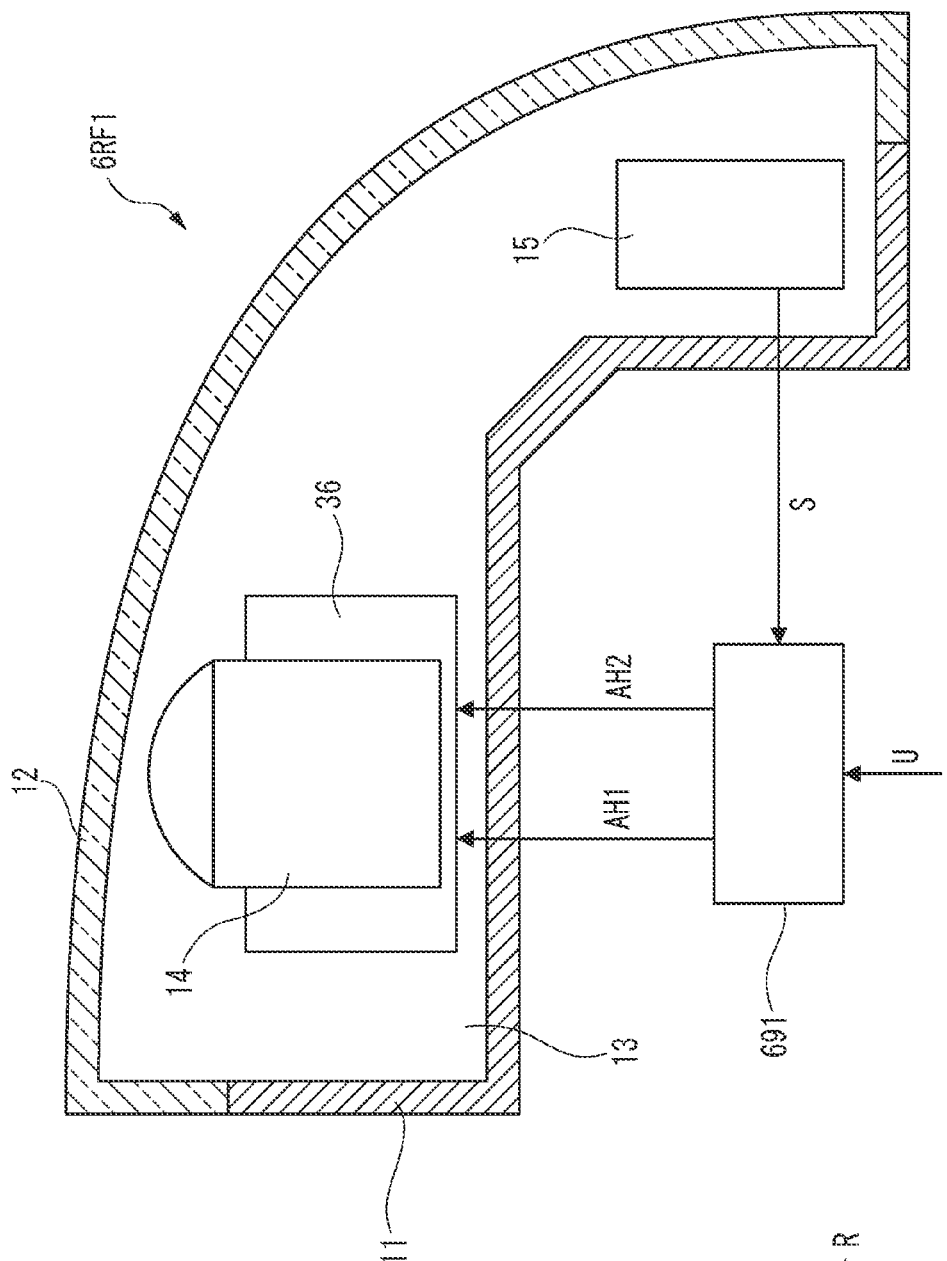
FIG. 8 illustrates a lighting system according to a first modified example of the sixth embodiment.
Figure 8:
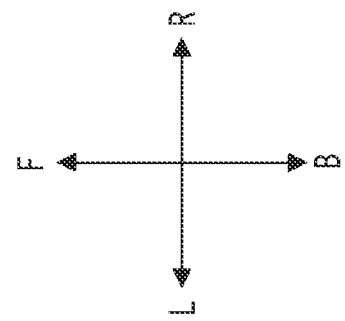

FIG. 8 schematically shows a right front lighting system 6RF1 according to a first modified example of the sixth embodiment. Although not shown, a left front lighting system mounted on the left front corner of the vehicle 100 has a configuration symmetrical with the right front lighting system 6RF1. Components that are the same as or equivalent to those of the right front lighting system 4RF according to the fourth embodiment and the right front lighting system 6RF according to the sixth embodiment are assigned with the same reference numerals, and repetitive descriptions for those will be omitted.

The right front lighting system 6RF1 includes a signal processor 691, which is an example of a corrector. After the lighting reference position of light source 14 with respect to the housing 11 is adjusted by using the light source actuator 36, the signal processor 691 generates the first horizontal actuation signal AH1 and the first vertical actuation signal AV1 based on user input signal U, and input the same to the light source actuator 36. The signal processor 691 is configured to obtain information as to the lighting reference position of the light source 14 with respect to the vehicle body based on the user input signal U or the first horizontal actuation signal AH1 and the first vertical actuation signal AV1.

The signal processor 691 is configured to receive the sensing signal S output from the LiDAR sensor 15, and to correct the information obtained from the sensing signal S based on the information as to the lighting reference position of the light source 14 with respect to the vehicle body. The correction may be performed on the sensing signal S itself, or may be performed on another signal or data corresponding to the sensing signal S.

Figure 9:
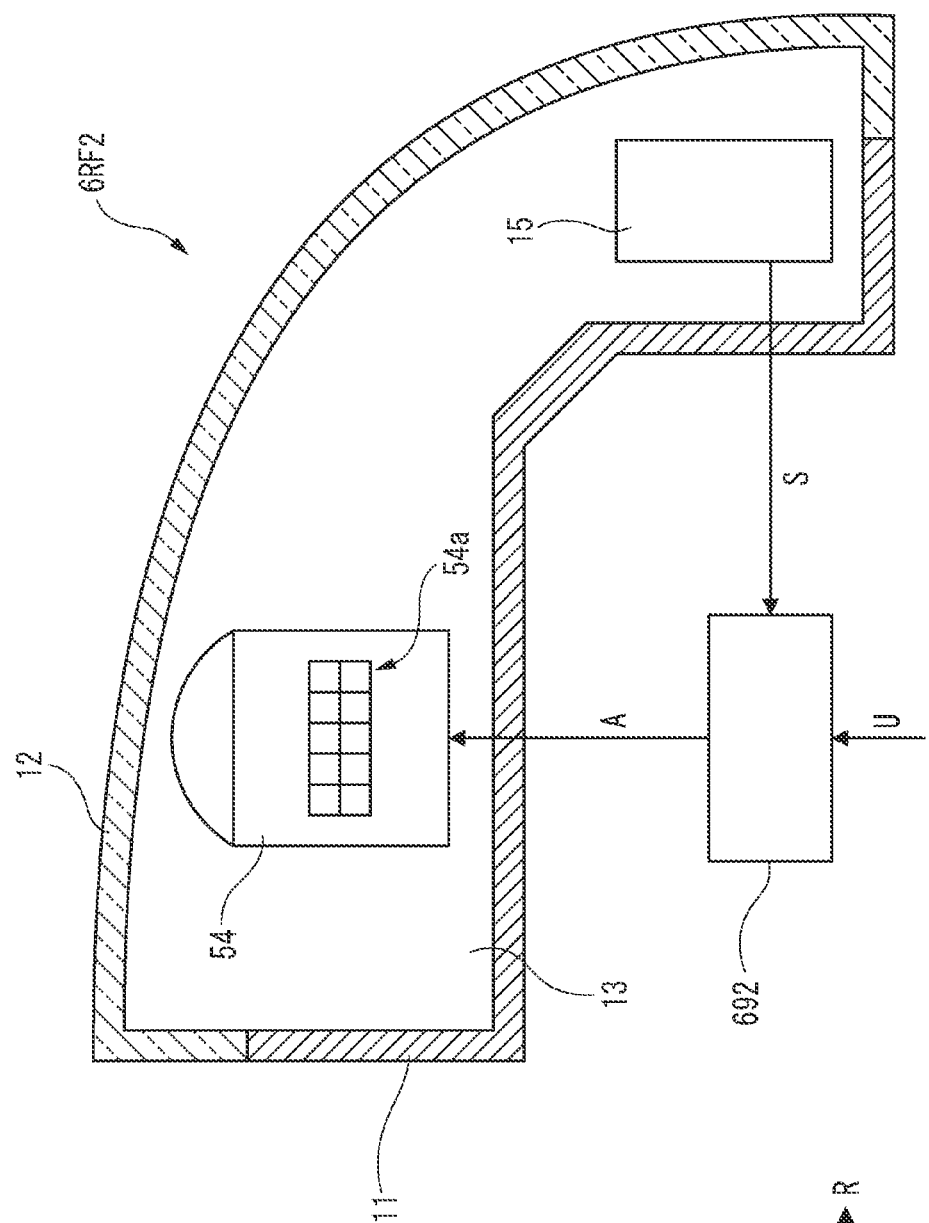
FIG. 9 illustrates a lighting system according to a second modified example of the sixth embodiment.

FIG. 9 schematically shows a right front lighting system 6RF2 according to a second modified example of the sixth embodiment. Although not shown, a left front lighting system mounted on the left front corner of the vehicle 100 has a configuration symmetrical with the right front lighting system 6RF2. Components that are the same as or equivalent to those of the right front lighting system 5RF according to the fifth embodiment and the right front lighting system 6RF according to the sixth embodiment are assigned with the same reference numerals, and repetitive descriptions for those will be omitted.

The right front lighting system 6RF2 includes a signal processor 692, which is an example of a corrector. After the lighting reference position of the light source 54 with respect to the housing 11 is adjusted, the signal processor 692 generates an adjustment signal A based on the user input signal U and input the same to the light source 54. The signal processor 692 is configured to obtain information as to the lighting reference position of the light source 54 with respect to the vehicle body based on the user input signal U or the adjustment signal A.

The signal processor 692 is configured to receive the sensing signal S output from the LiDAR sensor 15, and to correct the information obtained from the sensing signal S based on the information as to the lighting reference position of the light source 54 with respect to the vehicle body. The correction may be performed on the sensing signal S itself, or may be performed on another signal or data corresponding to the sensing signal S.

Figure 10:
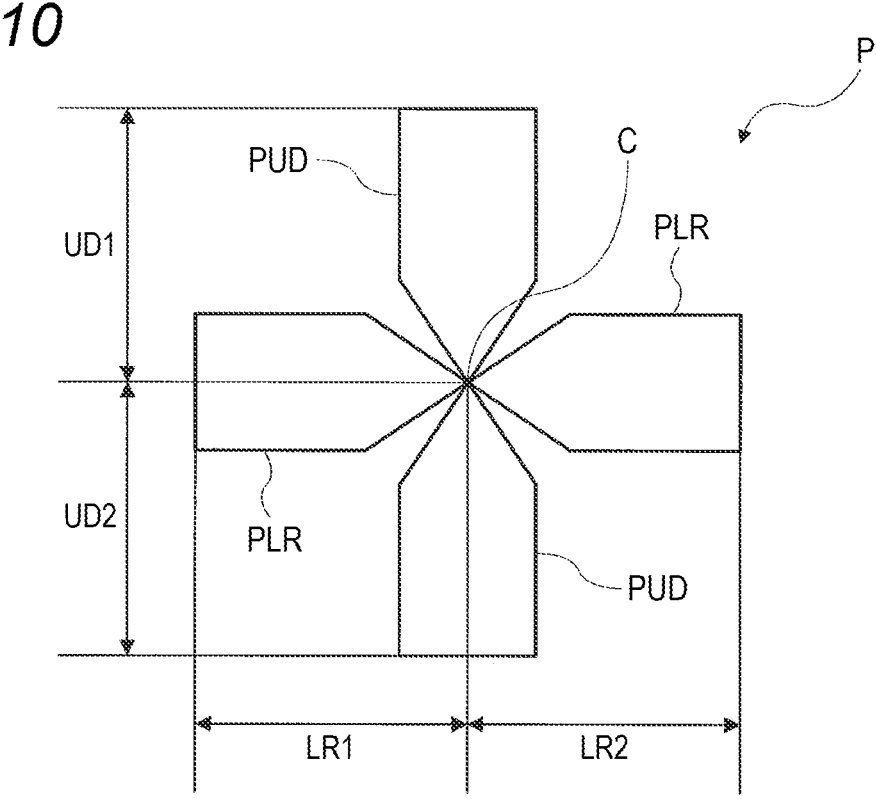
FIG. 10 illustrates a pattern formed by a light source of the lighting system.

The light source 14 shown in FIGS. 2-5, 7, and 8 is configured to be capable of forming a pattern P shown in FIG. 10 on a wall positioned ahead thereof.

A symbol C represents the center of the pattern P. The symbol UD1 represents a dimension from the center C to an upper end of the pattern P. The symbol UD2 represents a dimension from the center to a lower end of the pattern P. The dimensions UD1 and UD2 are equal. The symbol LR1 represents a dimension from the center to a left end of the pattern P. The symbol LR2 represents a dimension from the center to a right end of the pattern P. The dimension LR1 is equal to the dimension LR2. The pattern P has a straight portion PUD extending in the up-down direction and a straight portion PLR extending in the left-right direction.

Such a pattern P can be formed, for example, by passing light emitted from a lamp light source or a light emitting element through a shade.

Such a pattern P can also be formed by the light source 54 shown in FIGS. 6 and 9. Specifically, the pattern P can be formed by appropriately turning on and off each of the plurality of light emitting elements 54a arranged two-dimensionally.

The pattern P is used to obtain information as to the posture of the light source 14 with respect to the vehicle body or the lighting reference position of the light source 54 after the light source 14 or the lighting system including the light source 54 is mounted on the vehicle body.

Figure 11:
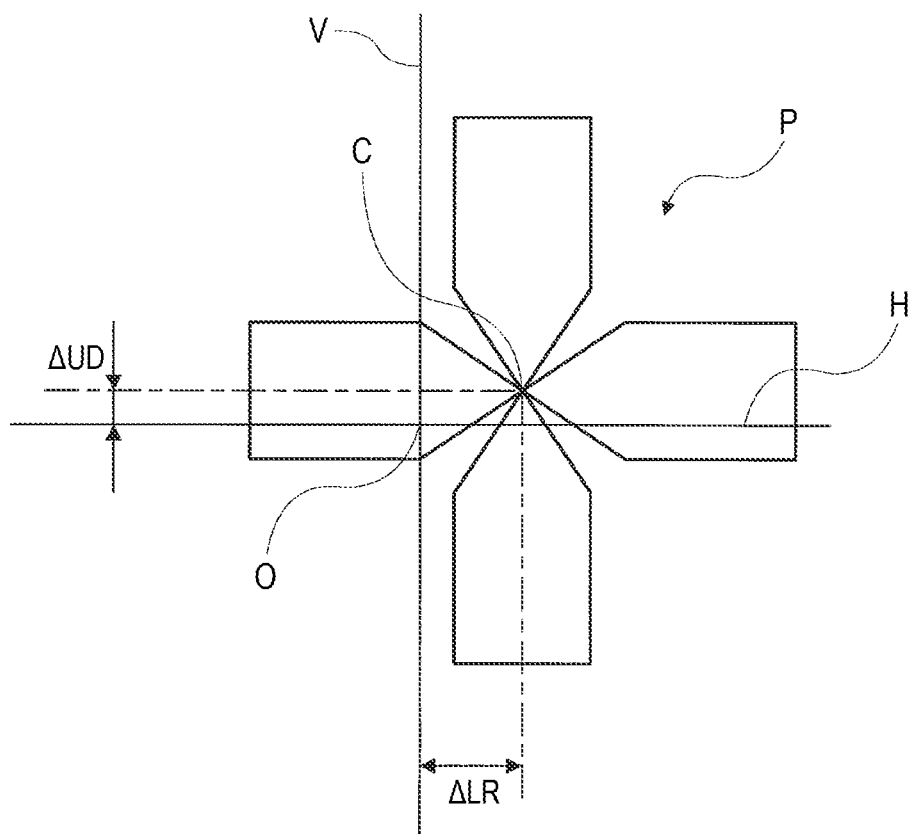
FIG. 11 illustrates information obtained from the pattern of FIG. 10.

As shown in FIG. 11, a vertical axis V and a horizontal axis H are displayed on a wall surface disposed in front of the light source 14 or the light source 54. A symbol O represents the intersection of the vertical axis V and the horizontal axis H. When the lighting system comprising the light source 14 or the light source 54 is mounted in a predetermined position on the vehicle body, the intersection O coincides with the center C of the pattern P. When the lighting system is mounted in a predetermined posture with respect to the vehicle body, the straight portion PUD of the pattern P extends parallel to the vertical axis V, and the straight portion PLR of the pattern P extends parallel to the horizontal axis H.

In an example shown in FIG. 11, the center C of the pattern P is deviated upward by ΔUD and rightward by ΔLR from the intersection O. This phenomenon means that the mounting position of the lighting system is deviated upward by ΔUD and rightward by ΔLR from the predetermined position.

Figure 12:
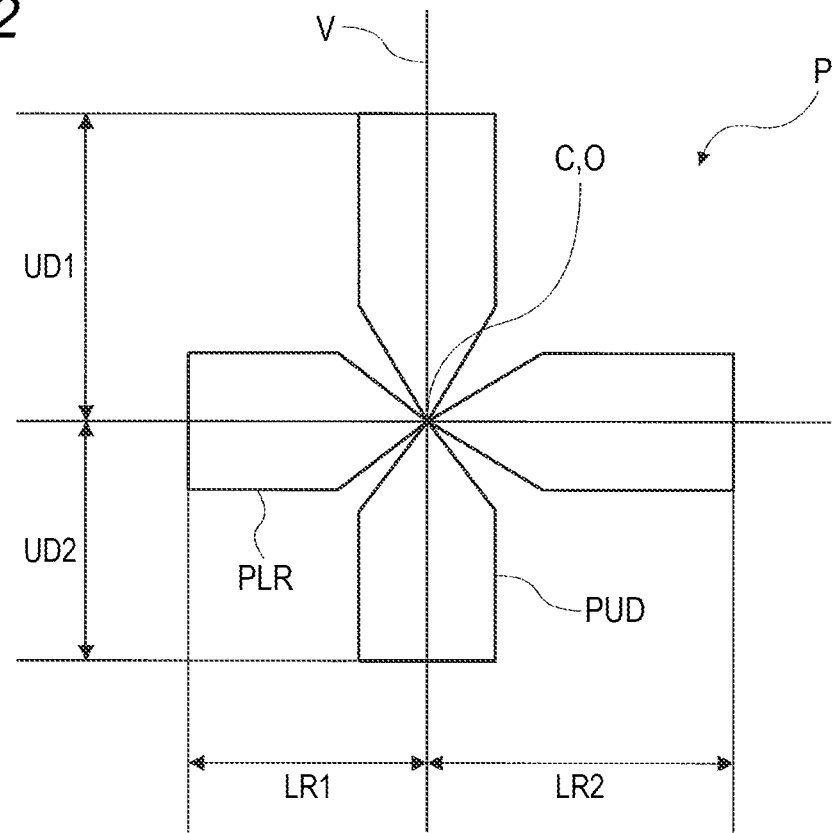
FIG. 12 illustrates information obtained from the pattern of FIG. 10.

In an example shown in FIG. 12, since the center C and the intersection O of the pattern P coincide with each other, the dimensions UD1 and UD2 shall be equal to each other. However, the dimensions UD1 and UD2 are actually different from each other. This phenomenon means that the mounting posture of the lighting system is inclined in the up-down direction of from a predetermined posture (inclined in a plane extending in the front-rear direction and the up-down direction of the vehicle). When the dimension UD1 is larger, the lighting system is tilted upward from the predetermined posture. When the dimension UD2 is larger, the lighting system is tilted downward from the predetermined posture.

In the example shown in FIG. 12, the dimensions LR1 and LR2 are different from each other. This phenomenon means that the mounting posture of the lighting system is inclined in the left-right direction of the vehicle from a predetermined posture (inclined in a plane extending in the front-rear direction and the left-right direction of the vehicle). When the dimension LR1 is larger, the lighting system is tilted leftward from the predetermined posture. When the dimension LR2 is larger, the lighting system is tilted rightward from the predetermined posture.

That is, the example shown in FIG. 12 means that the mounting posture of the lighting system is inclined upward and rightward from the predetermined posture.

Figure 13:
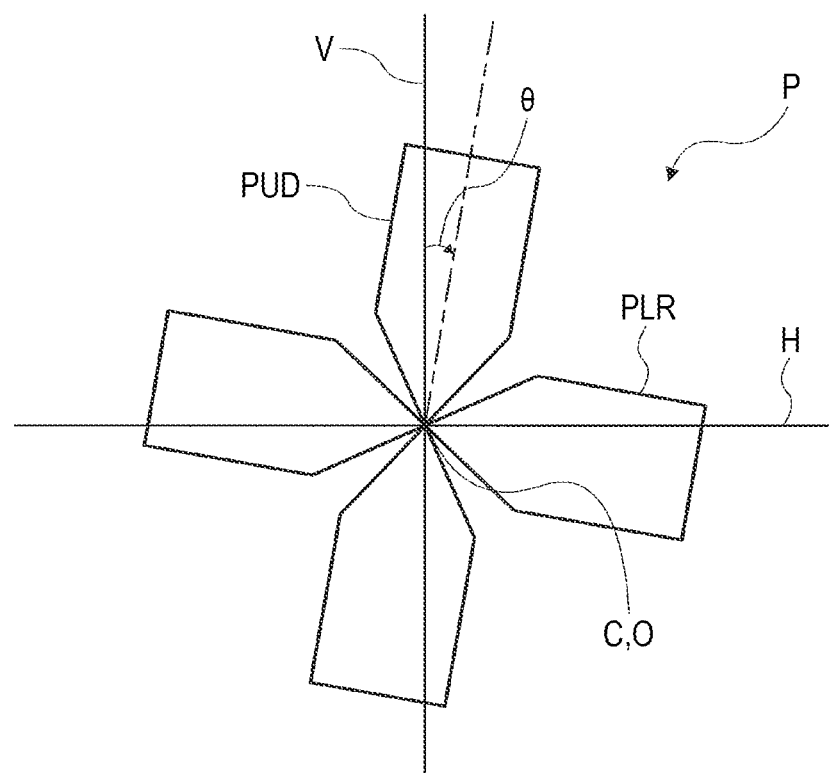
FIG. 13 illustrates information obtained from the pattern of FIG. 10.

In an example shown in FIG. 13, although the center C and the intersection O of the pattern P coincide with each other, the straight line portion PUD and the straight line portion PLR are inclined by an angle θ from the vertical axis V and the horizontal axis H, respectively. This phenomenon means that the mounting posture of the lighting system is inclined by the angle θ in a plane extending in the up-down direction and the left-right direction of the vehicle from a predetermined posture.

Actually, the phenomena shown in FIG. 11 to FIG. 13 appear in a complex manner, and it is obtained the information as to the deviation of the mounting position of the lighting system from the predetermined position and the inclination of the mounting posture from the predetermined posture described with reference to each drawing. Based on this information, an adjustment operation is performed so as to minimize the deviation and the inclination.

In the right front lighting system 1RF according to the first embodiment, the posture of the light source 14 is adjusted by actuating the first screw mechanism 16. The result of the adjustment is reflected in the posture adjustment of the LiDAR sensor 15 through the second screw mechanism 17. The posture of the LiDAR sensor 15 may be adjusted through actuation of the second screw mechanism 17 so that a desired adjustment is made for the light source 14.

In the right front lighting system 2RF according to the second embodiment, the posture of the light source 14 is adjusted by actuating the first screw mechanism 16. The adjustment result is reflected on the posture adjustment of the LiDAR sensor 15 through the sensor actuator 27.

In the right front lighting system 3RF according to the third embodiment, the posture of the LiDAR sensor 15 is adjusted by actuating the second screw mechanism 17. The adjustment result is reflected on the posture adjustment of the light source 14 through the light source actuator 36.

In the right front lighting system 4RF according to the fourth embodiment, the user input signal U is input to the signal processor 49 so that a desired adjustment is made for the light source 14. Based on the user input signal U, the posture of the light source 14 is adjusted by the light source actuator 36 and the posture of the LiDAR sensor 15 is adjusted by the sensor actuator 27.

In the right front lighting system 5RF according to the fifth embodiment, the user input signal U is input to the signal processor 59 so that a desired adjustment is made for the light source 54. The adjustment of the lighting reference position of the light source 54 and the adjustment of the sensing reference position of the LiDAR sensor 15 by the sensor actuator 27 are performed based on the user-input signal U.

In the right front lighting system 6RF according to the sixth embodiment, the posture of the light source 14 is adjusted by actuating the first screw mechanism 16. The adjustment result is reflected in the correction performed by the signal processor 69 with respect to the sensing signal S output from the LiDAR sensor 15.

In the right front lighting system 6RF1 according to the first modified example of the sixth embodiment, the user input signal U is input to the signal processor 691 so that a desired adjustment is made for the light source 14. The user-input signal U is reflected in the correction performed by the signal processor 691 on the sensing signal S output from the LiDAR sensor 15.

In the right front lighting system 6RF2 according to the second modified example of the sixth embodiment, the user input signal U is input to the signal processor 692 so that a desired adjustment is made for the light source 54. The user-input signal U is reflected in the correction performed by the signal processor 692 on the sensing signal S output from the LiDAR sensor 15.

The shape of the pattern P formed by the light source 14 or the light source 54 is not limited to the above example. As long as the center C, the dimension UD1, the dimension UD2, the dimension LR1, the dimension LR2, and the inclination of the pattern P can be specified, an appropriate shape can be adopted.

The above-described embodiments are merely examples for facilitating understanding of the gist of the presently disclosed subject matter. The configuration according to each of the above embodiments can be appropriately modified or improved without departing from the gist of the presently disclosed subject matter.

In the first embodiment to the sixth embodiment, the light source 14 (54) and the LiDAR sensor 15 are housed in the common housing 11. The advantages explained by referring to each of the above embodiments can be more remarkable when an attempt is made to locate the light source 14 (54) and the LiDAR sensor 15 in the lamp chamber 13 with a limited space.

In addition, by accommodating the light source 14 (54) and the LiDAR sensor 15 in a common housing 11, the relative position changes between them can be minimized. Accordingly, the association between the lighting reference position of the light source 14 (54) and the sensing reference position of the LiDAR sensor 15 can be enhanced.

However, the light source 14 (54) and the LiDAR sensor 15 may be housed in separate housings. Alternatively, the LiDAR sensor 15 may be mounted on the exterior of a housing accommodating the light source 14 (54).

In the first to sixth embodiments, the light source 14 (54) is arranged to light at least ahead of the vehicle 100 (an example of the front-rear direction of the vehicle), and the LiDAR sensor 15 is arranged to obtain information of at least on the right of the vehicle 100 (an example of the left-right direction of the vehicle). However, the LiDAR sensor 15 may be arranged so as to obtain information of at least ahead of the vehicle 100.

In the first to sixth embodiments, a LiDAR sensor is used as a sensor for obtaining information as to the outside of the vehicle 100. However, a sensor to be used may be appropriately selected depending on the type of information to be obtained. As such a sensor, a millimeter wave radar sensor, an ultrasonic sonar, a visible light camera, a non-visible light camera or the like can be exemplified.

In the first to sixth embodiments, the left front lighting system and the right front lighting system are exemplified as the lighting system including the LiDAR sensor 15. However, the configuration described with reference to the right front lighting system is also applicable to a left rear lighting system 1LB arranged in a left rear corner of the vehicle 100 shown in FIG. 1 and a right rear lighting system 1RB arranged in a right rear corner of the vehicle 100. For example, the right rear lighting system 1RB may have a configuration symmetric with respect to the right front lighting system relative to the front-rear direction (the light source may be appropriately changed). The left rear lighting system 1LB may have a configuration symmetrical with the right rear lighting system 1RB relative to the left-right direction.

Figure 14:
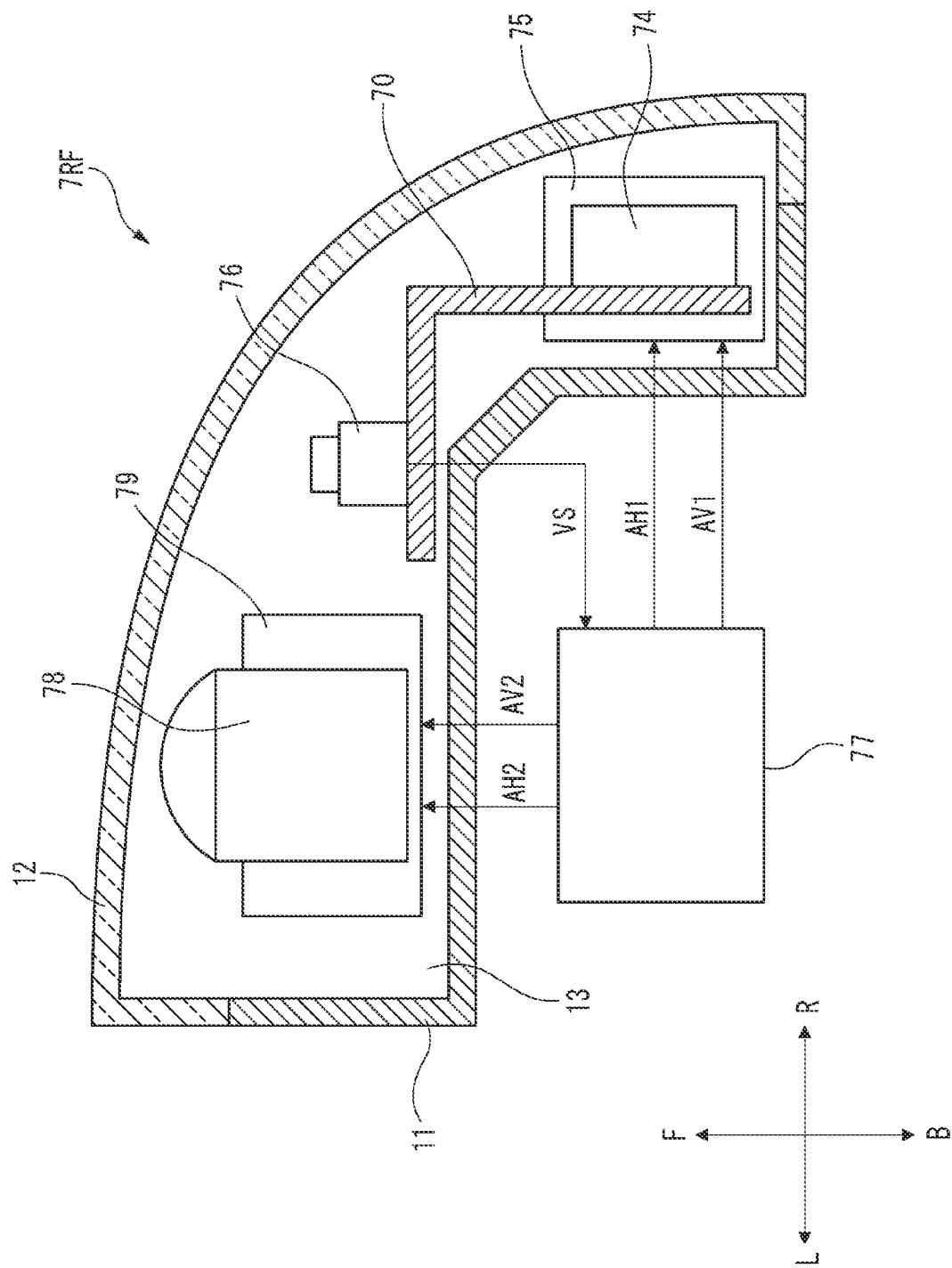
FIG. 14 illustrates a sensor system according to a seventh embodiment.

FIG. 14 schematically shows a configuration of a right front sensor system 7RF according to a seventh embodiment. Although not shown, a left front sensor system has a configuration symmetrical with the right front sensor system 7RF. Components that are the same as or equivalent to those of the right front lighting system 1RF according to the first embodiment are assigned with the same reference numerals, and repetitive descriptions for those will be omitted.

The right front sensor system 7RF includes a light source 78. The light source 78 includes an optical system including at least one of a lens and a reflector, and emits light that lights a predetermined area. The light source 78 is disposed in the lamp chamber 13. As the light source 78, a lamp light source or a light emitting element can be used. Examples of a lamp light source include an incandescent lamp, a halogen lamp, a discharge lamp, and a neon lamp. Examples of the light emitting element include a light emitting diode, a laser diode, and an organic EL element.

The right front sensor system 7RF includes a LiDAR sensor 74, which is an example of a first sensor. The LiDAR sensor 74 has a configuration for emitting non-visible light and a configuration for sensing returned light as a result of the non-visible light being reflected by an object existing outside the vehicle 100. That is, the LiDAR sensor 74 is a sensor for sensing information of the outside of the vehicle 100. As required, the LiDAR sensor 74 may include a scan device that sweeps the non-visible light to change the light emitting direction (i.e., the sensing direction). In the present embodiment, infrared light having a wavelength of 905 nm is used as the non-visible light.

The LiDAR sensor 74 can obtain the distance to the object associated with the returned light, for example, based on the time period from the time when the non-visible light is emitted in a certain direction to the time when the returned light is sensed. Further, by accumulating such distance data in association with the sensing position, it is possible to obtain information as to the shape of the object associated with the returned light. Additionally or alternatively, information as to an attribute such as the material of the object associated with the returned light can be obtained based on the difference in wavelength between the emitted light and the returned light. Additionally or alternatively, information about the color of the object, such as a white line on the road surface, can be obtained, for example, based on the difference in reflectivity of the returned light from the road surface.

The LiDAR sensor 74 outputs a signal corresponding to an attribute (intensity, wavelength or the like) of the sensed returned light. The above-mentioned information is obtained by appropriately processing signal output from the LiDAR sensor 74 by an information processor (not shown). The information processor may be provided in the right front sensor system 7RF or may be mounted on the vehicle 100.

The right front sensor system 7RF includes a sensor actuator 75, which is an example of the first adjuster. The sensor actuator 75 is a device for adjusting the posture of the LiDAR sensor 74. At least a portion of the sensor actuator 75 is disposed in the lamp chamber 13 and is coupled to the LiDAR sensor 74.

The sensor actuator 75 is configured to change the posture of the LiDAR sensor 74 in a horizontal plane (in a plane including the front-rear direction and the left-right direction in the drawing) and in a vertical plane (in a plane including the left-right direction and the up-down direction in the drawing). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The right front sensor system 7RF includes a camera 76, which is an example of a second sensor. The camera 76 is a device for capturing an image of the outside of the vehicle 100. That is, the camera 76 senses information of the outside of the vehicle 100 in a manner different from that of the LiDAR sensor 74. The camera 76 is configured to output a video signal VS corresponding to the captured image.

The right front sensor system 7RF includes a signal processor 77. The signal processor 77 may be realized as a function of an electronic control unit (ECU) mounted on the vehicle 100, or may be realized as a function of a control device (controller) disposed in the lamp chamber 13.

The signal processor 77 is configured to specify a deviation amount of an imaging reference position of the camera 76 from a predetermined position based on the video signal VS output from the camera 76.

Figure 15:
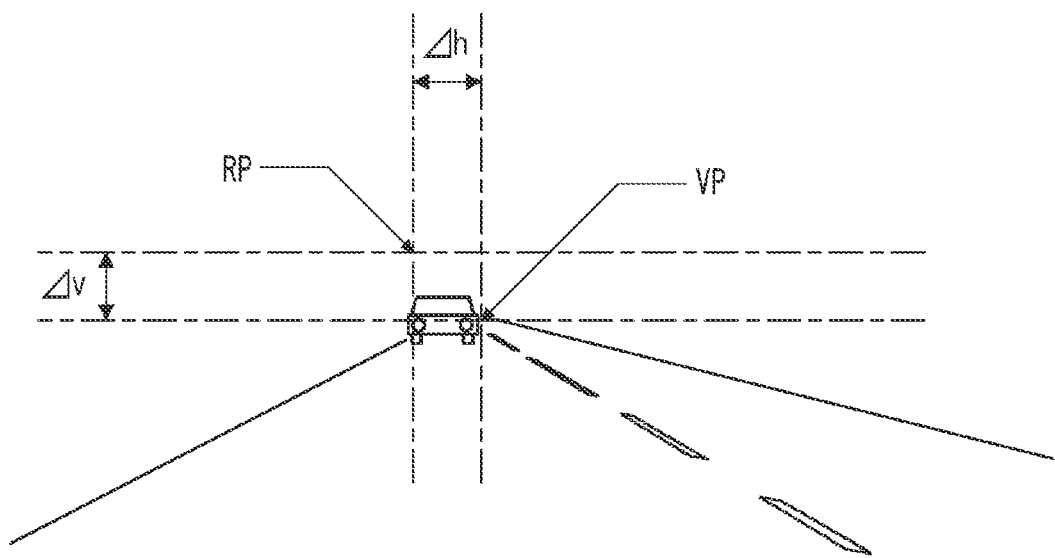
FIG. 15 illustrates operations of a signal processor in the sensor system.

FIG. 15 shows an example of an image captured by the camera 76. A symbol RP represents an imaging reference point of the camera 76. The imaging reference point RP is defined as, for example, the center point of the field of view of the camera 76. A symbol VP represents a vanishing point of a so-called straight road, i.e., a point at which parallel lines such as white lanes appear to merge. It is desirable that the imaging reference point RP coincides with the vanishing point VP.

The signal processor 77 specifies the vanishing point VP in the captured image by processing the video signal VS, and specifies the deviation amount of the imaging reference point RP from the specified vanishing point VP. In the example shown in FIG. 15, the imaging reference point RP is deviated upward by $\Delta v$ and leftward by $\Delta h$ from the vanishing point VP. Such a deviation is caused by a positional deviation occurred when the camera 76 is mounted on the housing 11, a positional deviation occurred when the housing 11 is mounted on the vehicle 100, or the like.

The vanishing point VP (an example of a predetermined position) may be replaced with a reference point displayed on a screen disposed in front of the camera 76.

The signal processor 77 generates a first horizontal actuation signal AH1 and a first vertical actuation signal AV1 based on the specified deviation amount of the imaging reference point RP, and inputs the same to the sensor actuator 75.

The first horizontal actuation signal AH1 has an attribute (voltage value, current value, frequency, etc.) corresponding to the adjusted amount of the posture of the LiDAR sensor 74 in the horizontal plane, which is determined based on the horizontal deviation amount $\Delta h$ of the specified imaging reference point RP.

The relationship between the deviation amount $\Delta h$ and the adjustment amount of the posture of the LiDAR sensor 74 in the horizontal plane can be stored in advance in the signal processor 77. For example, the deviation amount in the horizontal plane of the sensing reference position of the LiDAR sensor 74, which may occur when the deviation amount in the horizontal direction of the imaging reference point RP is $\Delta h$, can be stored in the signal processor 77 as a function or a correspondence table. The signal processor 77 generates the first horizontal actuation signal AH1 so as to cancel the deviation in the horizontal plane of the sensing reference position of the LiDAR sensor 74 specified on the basis of the relationship.

The first vertical actuation signal AV1 has an attribute (voltage value, current value, frequency, etc.) corresponding to the adjusted amount of the posture of the LiDAR sensor 74 in the vertical plane, which is determined on the basis of the vertical deviation amount $\Delta v$ of the specified imaging reference point RP.

The relation between the deviation amount $\Delta v$ and the adjustment amount of the posture of the LiDAR sensor 74 in the vertical plane can be stored in advance in the signal processor 77. For example, the deviation amount in the vertical plane of the sensing reference position of the LiDAR sensor 74, which may occur when the deviation amount in the vertical direction of the imaging reference point RP is $\Delta v$, can be stored in the signal processor 77 as a function or a correspondence table. The signal processor 77 generates the first vertical actuation signal AV1 so as to cancel the deviation in the vertical plane of the sensing reference position of the LiDAR sensor 74 specified on the basis of the relationship.

The output of the first horizontal actuation signal AH1 and the first vertical actuation signal AV1 by the signal processor 77 are made after the horizontal and vertical posture adjustments of the LiDAR sensor 74 with respect to the housing 11 using the sensor actuator 75 is completed.

That is, the posture adjustment of the LiDAR sensor 74 by the sensor actuator 75 with the aid of the signal processor 77 is performed based on an image of the outside of the vehicle 100 (an example of information) captured by the camera 76 after the right front sensor system 7RF is mounted on the vehicle 100.

According to such a configuration, since the posture of the LiDAR sensor 74 is automatically adjusted based on, for example, the positional deviation of the right front sensor system 7RF with respect to the vehicle body sensed through the camera 76, it is possible to reduce the burden of the work for adjusting the posture of the LiDAR sensor 74 with respect to the vehicle body.

The posture of the LiDAR sensor 74 is adjusted by the sensor actuator 75 coupled to the LiDAR sensor 74. According to such a configuration, for example, the posture of the LiDAR sensor 74 can be adjusted by using an actuator used to change the sensing range of the LiDAR sensor 74 in the horizontal plane and the sensing range in the vertical plane. In this instance, the posture adjustment corresponds to adjustment of the sensing reference position of the LiDAR sensor 74. Therefore, a separate adjustment mechanism such as an aiming screw mechanism can be omitted for the LiDAR sensor 74.

In the above descriptions, the deviation amount $\Delta h$ and the first horizontal actuation signal AH1 are associated in the one-by-one manner. Similarly, the deviation amount $\Delta v$ and the first vertical actuation signal AV1 are associated in the one-by-one manner. However, the deviation amount $\Delta h$ may be associated with both the first horizontal actuation signal AH1 and the first vertical actuation signal AV1. Similarly, the deviation amount $\Delta v$ may be associated with both the first horizontal actuation signal AH1 and the first vertical actuation signal AV1. In this instance, for example, when the horizontal deviation of the imaging reference point RP of the camera 76 is sensed, both the posture adjustment in the horizontal plane and the posture adjustment in the vertical plane of the LiDAR sensor 74 on the basis of the above associations are performed.

As shown in FIG. 14, the LiDAR sensor 74 and the camera 76 may be supported by a common support member 70. The common support member 70 may be a portion of the housing 11, or may be a member such as a bracket independent of the housing 11.

In this instance, the posture of the camera 76 can be adjusted at the same time as the posture of the LiDAR sensor 74 is adjusted. That is, the posture of the LiDAR sensor 74 is adjusted based on the image captured by the camera 76, and the image capturing reference point RP of the camera 76 can be adjusted through the adjustment. Therefore, in a case where plural kinds of sensors including the LiDAR sensor 74 and the camera 76 are mounted on the vehicle 100, the burden of the work for adjusting the sensing reference position of each sensor can be reduced.

The right front sensor system 7RF may include a light source actuator 79, which is an example of the second adjuster. The light source actuator 79 is a device for adjusting the posture of the light source 78. At least a portion of the light source actuator 79 may be disposed in the lamp chamber 13.

The light source actuator 79 can be configured to change the posture of the light source 78 in a horizontal plane (in a plane including the front-rear direction and the left-right direction in the drawing) and in a vertical plane (in a plane including the left-right direction and the up-down direction in the drawing). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

In this case, the signal processor 77 generates a second horizontal actuation signal AH2 and a second vertical actuation signal AV2 based on the specified deviation amount of the imaging reference point RP, and inputs the same to the light source actuator 79.

The second horizontal actuation signal AH2 has an attribute (voltage value, current value, frequency, etc.) corresponding to the adjusted amount of the posture of the light source 78 in the horizontal plane, which is determined based on the horizontal deviation amount $\Delta h$ of the specified imaging reference point RP.

The relationship between the deviation amount $\Delta h$ and the adjustment amount of the posture of the light source 78 in the horizontal plane can be stored in advance in the signal processor 77. For example, the deviation amount in the horizontal plane of the lighting reference position of the light source 78, which would occur when the deviation amount in the horizontal direction of the imaging reference point RP is $\Delta h$, can be stored in the signal processor 77 as a function or a correspondence table. The signal processor 77 generates the second horizontal actuation signal AH2 so as to cancel the deviation amount in the horizontal plane of the lighting reference position of the light source 78 specified based on the relationship.

The second vertical actuation signal AV2 has an attribute (voltage value, current value, frequency, etc.) corresponding to the adjusted amount of the posture of the light source 78 in the vertical plane, which is determined based on the deviation amount $\Delta v$ in the vertical direction of the specified imaging reference point RP.

The relationship between the deviation amount $\Delta v$ and the adjustment amount of the posture of the light source 78 in the vertical plane can be stored in the signal processor 77 in advance. For example, the deviation amount in the vertical plane of the lighting reference position of the light source 78, which would occur when the deviation amount in the vertical direction of the imaging reference point RP is $\Delta v$, can be stored in the signal processor 77 as a function or a correspondence table. The signal processor 77 generates the second vertical actuation signal AV2 so as to cancel the deviation amount in the vertical plane of the lighting reference position of the light source 78 specified based on the relationship.

The output of the second horizontal actuation signal AH2 and the second vertical actuation signal AV2 by the signal processor 77 is made after the horizontal and vertical posture adjustment of the light source 78 with respect to the housing 11 using the light source actuator 79 is completed.

That is, the adjustment of the posture of the light source 78 by the light source actuator 79 using the signal processor 77 is performed based on an image of the outside of the vehicle 100 (an example of information) captured by the camera 76 after the right front sensor system 7RF is mounted on the vehicle 100.

According to such a configuration, since the posture of the light source 78 is automatically adjusted on the basis of, for example, the information as to the positional deviation with respect to the vehicle body sensed through the camera 76, it is possible to reduce the burden of the work for adjusting the posture of the light source 78 with respect to the vehicle body.

As described above, the posture of the light source 78 is adjusted by the light source actuator 79 coupled to the light source 78. According to such a configuration, for example, the posture of the light source 78 can be adjusted by using an actuator used to change the lighting range of the light source 78 in the horizontal plane and the vertical plane. In this case, the posture adjustment corresponds to adjusting the lighting reference position of the light source 78. Therefore, a separate adjustment mechanism such as an aiming screw mechanism can be omitted for the light source 78.

From the viewpoint of efficiently obtaining information around the vehicle and from the viewpoint of design, it is desired to dispose a sensor for obtaining information of the outside of the vehicle at locations in the vicinity of lighting devices that are disposed at four corners of the vehicle. According to such a configuration, since the posture adjustment of the light source 78 and the posture adjustment of the LiDAR sensor 74 can be associated with each other through the camera 76, the light source 78 can be integrated into the right front sensor system 7RF. That is, it is possible to satisfy the above-mentioned demand.

In the above descriptions, the deviation amount $\Delta h$ and the second horizontal actuation signal AH2 are associated with each other in the one-by-one manner. Similarly, the deviation amount $\Delta v$ and the second vertical actuation signal AV2 are associated with each other in the one-by-one manner. However, the deviation amount $\Delta h$ may be associated with both the second horizontal actuation signal AH2 and the second vertical actuation signal AV2. Similarly, the deviation amount $\Delta v$ may be associated with both the second horizontal actuation signal AH2 and the second vertical actuation signal AV2. In this case, for example, when the horizontal deviation of the imaging reference point RP of the camera 76 is sensed, both the posture adjustment in the horizontal plane and the posture adjustment in the vertical plane of the light source 78 (adjustment of the lighting reference position) on the basis of the above associations are performed.

In the present embodiment, the LiDAR sensor 74 is disposed so as to obtain information of at least on the right of the vehicle 100.

In order to obtain information as to the right side of the vehicle 100, it is preferable that the LiDAR sensor 74 is disposed at a position facing the right side of the vehicle body of the vehicle 100. In such a layout, there would be a case where the adjustment of the posture of the LiDAR sensor 74 is difficult due to structural reasons of the vehicle body. However, according to the above configuration, since the posture of the LiDAR sensor 74 is automatically adjusted based on the positional deviation of the right front sensor system 7RF with respect to the vehicle body sensed through the camera 76, the above-described difficulty can be avoided.

Figure 16:
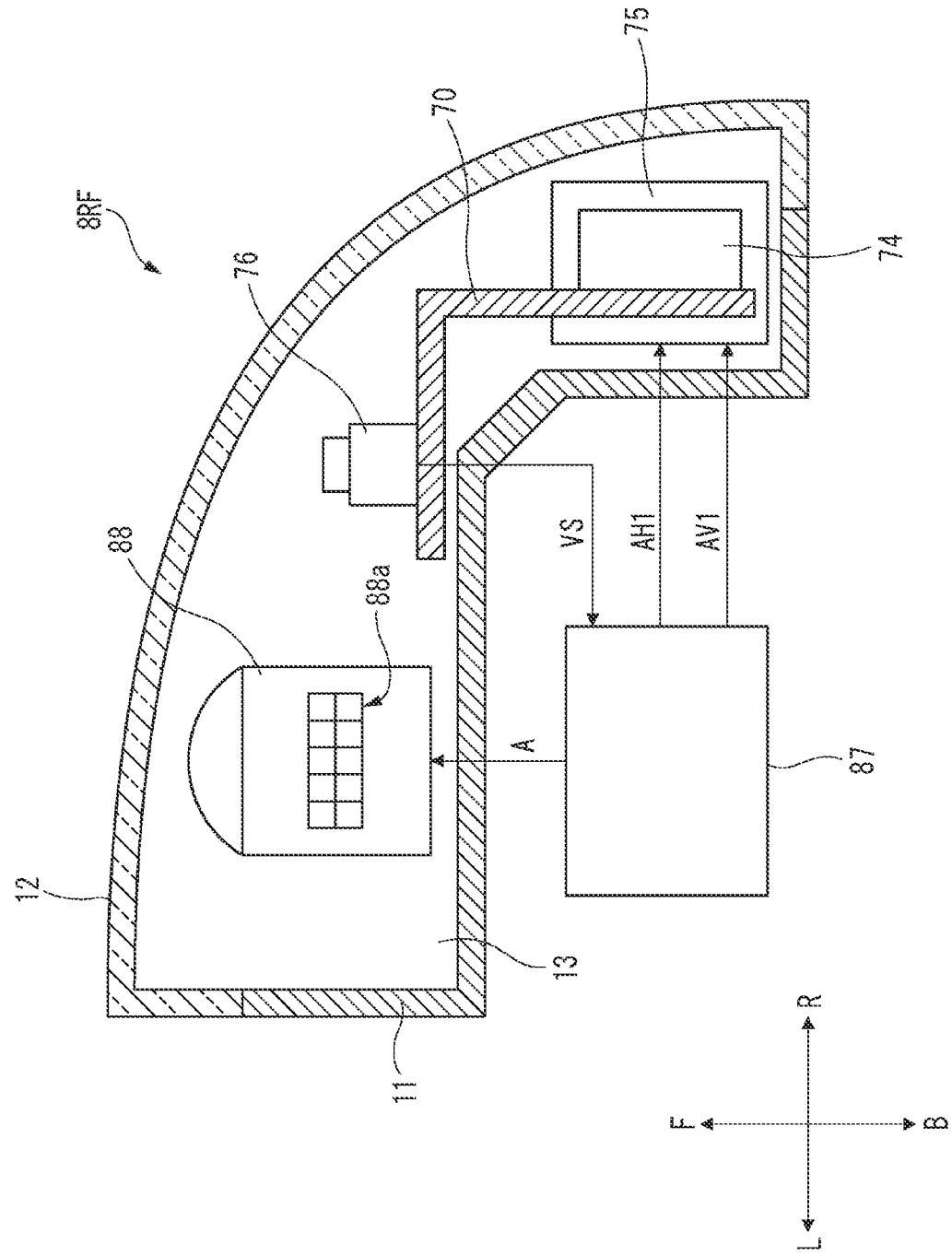
FIG. 16 illustrates a sensor system according to an eighth embodiment.

FIG. 16 schematically shows a configuration of a right front sensor system 8RF according to an eighth embodiment. Although not shown, a left front sensor system mounted on the left front corner of the vehicle 100 has a configuration symmetrical with the right front sensor system 8RF. Components that are the same as or equivalent to those of the right front sensor system 7RF according to the seventh embodiment are assigned with the same reference numerals, and repetitive descriptions for those will be omitted.

The right front sensor system 8RF includes a light source 88. The light source 88 includes a plurality of light emitting elements 88*a* arranged two-dimensionally in addition to an optical system including at least one of a lens and a reflector. Examples of the light emitting element include a light emitting diode, a laser diode, and an organic EL element. Each of the light emitting elements 88*a* can be turned on and off individually, and a predetermined area is lighted by light emitted from the turned-on light emitting element 88*a*.

In the present embodiment, at least one of the lighting reference position and the lighting range can be moved in at least one of the up-down direction and the left-right direction by appropriately changing the light emitting element 88*a* to be turned on and the light emitting element 88*a* to be turned off. It should be noted that the "up-down direction" used herein does not necessarily have to coincide with the vertical direction or the up-down direction of the vehicle 100. Similarly, the "left-right direction" used herein does not necessarily have to coincide with the horizontal direction or the left-right direction of the vehicle 100.

In addition to or instead of the above-described configuration, a MEMS mechanism or a scan mechanism may be used to deflect the light emitted from the light source in a desired direction to move at least one of the lighting reference position and the lighting range in at least one of the up-down direction and the left-right direction.

The right front sensor system 8RF includes a signal processor 87. The signal processor 87 may be realized as a function of an electronic control unit (ECU) mounted on the vehicle 100, or may be realized as a function of a control device (controller) disposed in the lamp chamber 13.

The signal processor 87 is configured to specify a deviation amount of the imaging reference position of the camera 76 from a predetermined position based on a video signal VS output from the camera 76.

Similar to the signal processor 77 described with reference to FIG. 15, the signal processor 87 specifies the vanishing point VP in the captured image by processing the video signal VS, and specifies the deviation amount of the imaging reference point RP from the specified vanishing point VP.

The signal processor 87 generates a first horizontal actuation signal AH1 and a first vertical actuation signal AV1 based on the specified deviation amount of the imaging reference point RP, and inputs the same to the sensor actuator 75. Since the operation of the signal processor 87 related to this point is the same as that of the signal processor 77 according to the seventh embodiment, repetitive descriptions for those will be omitted.

On the other hand, the signal processor 87 is configured to generate an adjustment signal A based on the specified deviation amount of the imaging reference point RP and input the same to the light source 88. The adjustment signal A includes information for adjusting the lighting reference position of the light source 88 in at least one of the up-down direction and the left-right direction. More concretely, it contains information for determining the light emitting elements 88*a* to be turned on and the light emitting elements 88*a* to be turned off, so that the lighting reference position moves at least one of the up-down direction and the left-right direction.

The relationship between the deviation amount of the imaging reference point RP in the horizontal direction and the adjustment amount of the lighting reference position in the left-right direction of the light source 88 can be stored in advance in the signal processor 87. For example, the deviation amount in the horizontal plane of the lighting reference position of the light source 88, which may occur when the deviation amount in the horizontal direction of the imaging reference point RP is Δh, can be stored in the signal processor 87 as a function or a correspondence table. The signal processor 87 generates the adjustment signal A so as to cancel the deviation amount in the left-right direction of the lighting reference position of the light source 88 specified on the basis of the relationship.

Similarly, the relationship between the deviation amount of the imaging reference point RP in the vertical direction and the adjustment amount of the lighting reference position in the up-down direction of the light source 88 can be stored in advance in the signal processor 87. For example, the deviation amount in the vertical plane of the lighting reference position of the light source 88, which may occur when the deviation amount in the vertical direction of the imaging reference point RP is Δv, can be stored in the signal processor 87 as a function or a correspondence table. The signal processor 87 generates the adjustment signal A so as to cancel the deviation amount in the up-down direction of the lighting reference position of the light source 88 specified on the basis of the relationship.

The output of the adjustment signal A by the signal processor 87 is made after the adjustment of the lighting reference position of the light source 88 with respect to the housing 11 is completed.

That is, the adjustment of the lighting reference position of the light source 88 with the aid of the signal processor 87 is performed based on an image of the outside of the vehicle 100 (an example of information) captured by the camera 76 after the right front sensor system 8RF is mounted on the vehicle 100.

According to such a configuration, since the lighting reference position of the light source 88 is automatically adjusted on the basis of the information as to the positional deviation of the right front sensor system 8RF with respect to the vehicle body sensed through the camera 76, for example, it is possible to reduce the burden of the work for adjusting the lighting reference position of the light source 88 with respect to the vehicle body.

From the viewpoint of efficiently obtaining information around the vehicle and from the viewpoint of design, it is desired to dispose a sensor for obtaining information of the outside of the vehicle at locations in the vicinity of lighting devices that are disposed at four corners of the vehicle. According to this configuration, since the posture adjustment of the light source 88 and the posture adjustment of the LiDAR sensor 74 can be associated with each other through the camera 76, the light source 88 can be integrated into the right front sensor system 8RF. That is, it is possible to satisfy the above-mentioned demand.

In addition, since the lighting reference position of the light source 88 is adjusted without using a mechanical component, it is easy to suppress an increase in size of the structure. Thus, integration of the light source 88 into the right front sensor system 8RF is facilitated.

In the above description, the deviation amount Δh and the adjustment of the lighting reference position in the left-right direction are associated in the one-by-one manner. Similarly, the deviation amount Δv and the adjustment of the lighting reference position in the up-down direction are associated in the one-by-one manner. However, the deviation amount Δh may be associated with the adjustment of the lighting reference position in both the left-right direction and the up-down direction. Similarly, the deviation amount Δv may be associated with the adjustment of the lighting reference position in both the left-right direction and the up-down direction. In this case, for example, when the horizontal deviation of the imaging reference point RP of the camera 76 is sensed, the necessary adjustment of the lighting reference position of the light source 88 based on the above associations is performed in both the left-right direction and the up-down direction.

Figure 17:
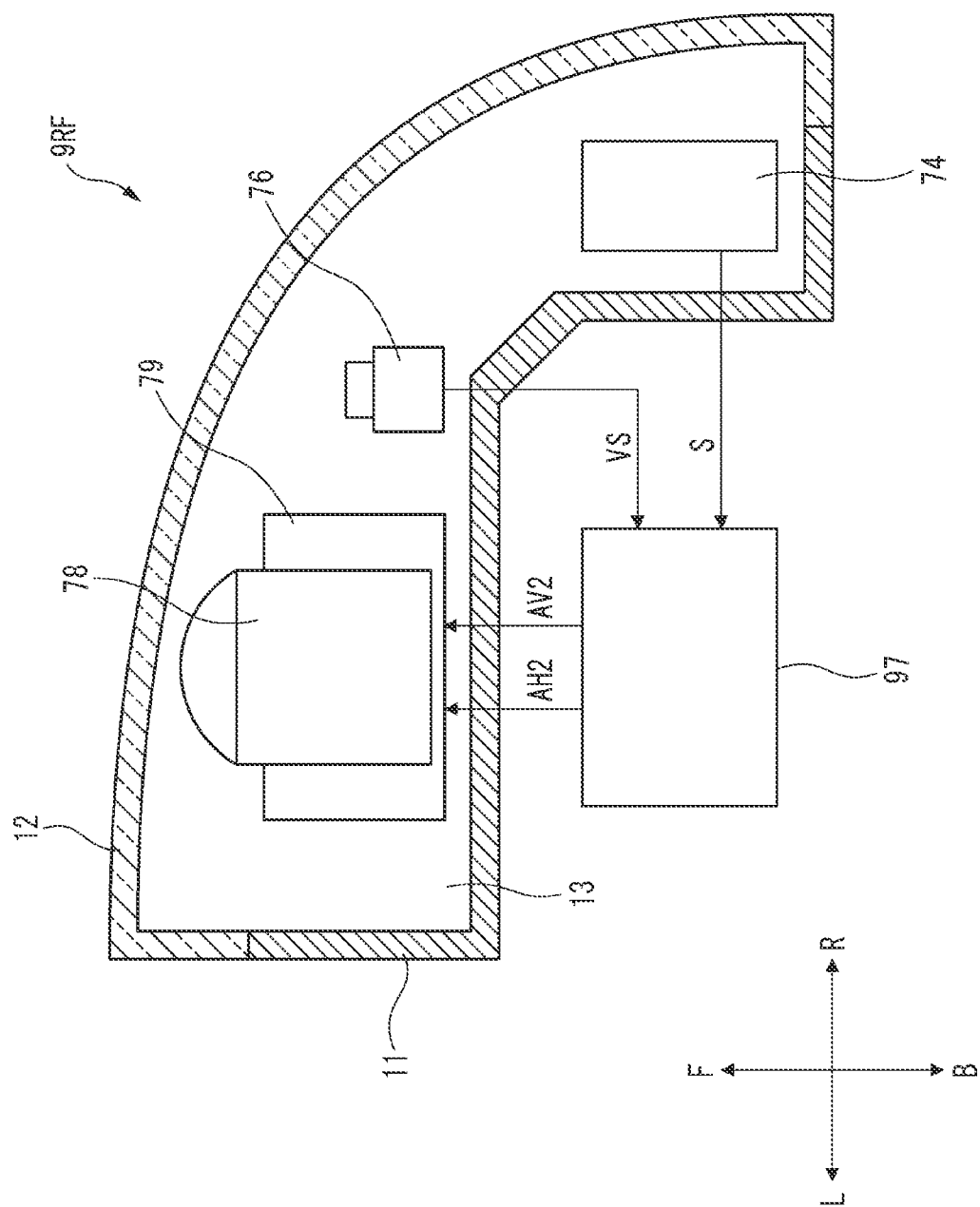
FIG. 17 illustrates a sensor system according to a ninth embodiment.

FIG. 17 schematically shows a configuration of a right front sensor system 9RF according to a ninth embodiment. Although not shown, a left front sensor system mounted on the left front corner of the vehicle 100 has a configuration symmetrical with the right front sensor system 9RF. Components that are the same as or equivalent to those of the right front sensor system 7RF according to the seventh embodiment are assigned with the same reference numerals, and repetitive descriptions for those will be omitted.

The right front sensor system 9RF includes a signal processor 97, which is an example of the corrector. The signal processor 97 may be realized as a function of an electronic control unit (ECU) mounted on the vehicle 100, or may be realized as a function of a control device (controller) disposed in the lamp chamber 13.

After the right front sensor system 9RF is mounted on the vehicle 100, the signal processor 97 specifies the deviation amount of the imaging reference position of the camera 76 from the predetermined position based on the video signal VS output from the camera 76.

Similar to the signal processor 77 described with reference to FIG. 15, the signal processor 97 specifies the vanishing point VP in the captured image by processing the video signal VS, and specifies the deviation amount of the imaging reference point RP from the specified vanishing point VP.

As described above, the LiDAR sensor 74 outputs a sensing signal S corresponding to the attribute of the sensed returned light (intensity, wavelength or the like). The signal processor 97 is configured to receive the sensing signal S, and to correct the information obtained from the sensing signal S based on the deviation amount of the imaging reference point RP of the camera 76 (an example of information sensed by the second sensor). The correction may be performed on the sensing signal S itself, or may be performed on another signal or data corresponding to the sensing signal S.

In the present embodiment, there is no mechanism for adjusting the posture of the LiDAR sensor 74, i.e., the sensing reference position. Therefore, when a deviation of the imaging reference point RP of the camera 76 is sensed, the posture of the LiDAR sensor 74 (the sensing reference position) is not changed so as to correspond to the deviation, but the information obtained from the LiDAR sensor 74 is corrected. Specifically, the information obtained from the LiDAR sensor 74 is corrected to the information that would have been obtained when there was no deviation relative to the imaging reference point RP of the camera 76. As a result, it is possible to obtain substantially the same information as the information obtained when the posture of the LiDAR sensor 74 (the sensing reference position) is changed so as to correspond to the deviation of the imaging reference point RP of the camera 76.

The signal processor 97 stores in advance a function or a table indicating the correspondence between the deviation amount of the imaging reference point RP of the camera 76 and the correction to the information obtained from the LiDAR sensor 74. The signal processor 97 executes the above-described correction processing while referring to the function or the table.

According to such a configuration, since the configuration for adjusting the sensing reference position of the LiDAR sensor 74 can be omitted, it is possible to reduce the burden of the work for adjusting the sensing reference position of the LiDAR sensor 74 with respect to the vehicle body.

In addition, since the configuration for adjusting the sensing reference position of the LiDAR sensor 74 can be omitted, it is easy to suppress an increase in size of the structure. This facilitates the integration of the camera 76 and the LiDAR sensor 74 into the right front sensor system 9RF.

The signal processor 97 generates a second horizontal actuation signal AH2 and a second horizontal actuation signal AH2 based on the specified deviation amount of the imaging reference point RP of the camera 76, and inputs the same to the light source actuator 79. Since the operation of the signal processor 97 related to this point is the same as that of the signal processor 77 according to the seventh embodiment, repetitive descriptions for those will be omitted.

From the viewpoint of efficiently obtaining information around the vehicle and from the viewpoint of design, it is desired to dispose a sensor for obtaining information of the outside of the vehicle at locations in the vicinity of lighting devices that are disposed at four corners of the vehicle. According to the configuration of the present embodiment, since the configuration for adjusting the sensing reference position of the LiDAR sensor 74 can be omitted, it is easy to suppress an increase in size of the structure. Accordingly, it is possible to satisfy the above-mentioned demand.

Figure 18:
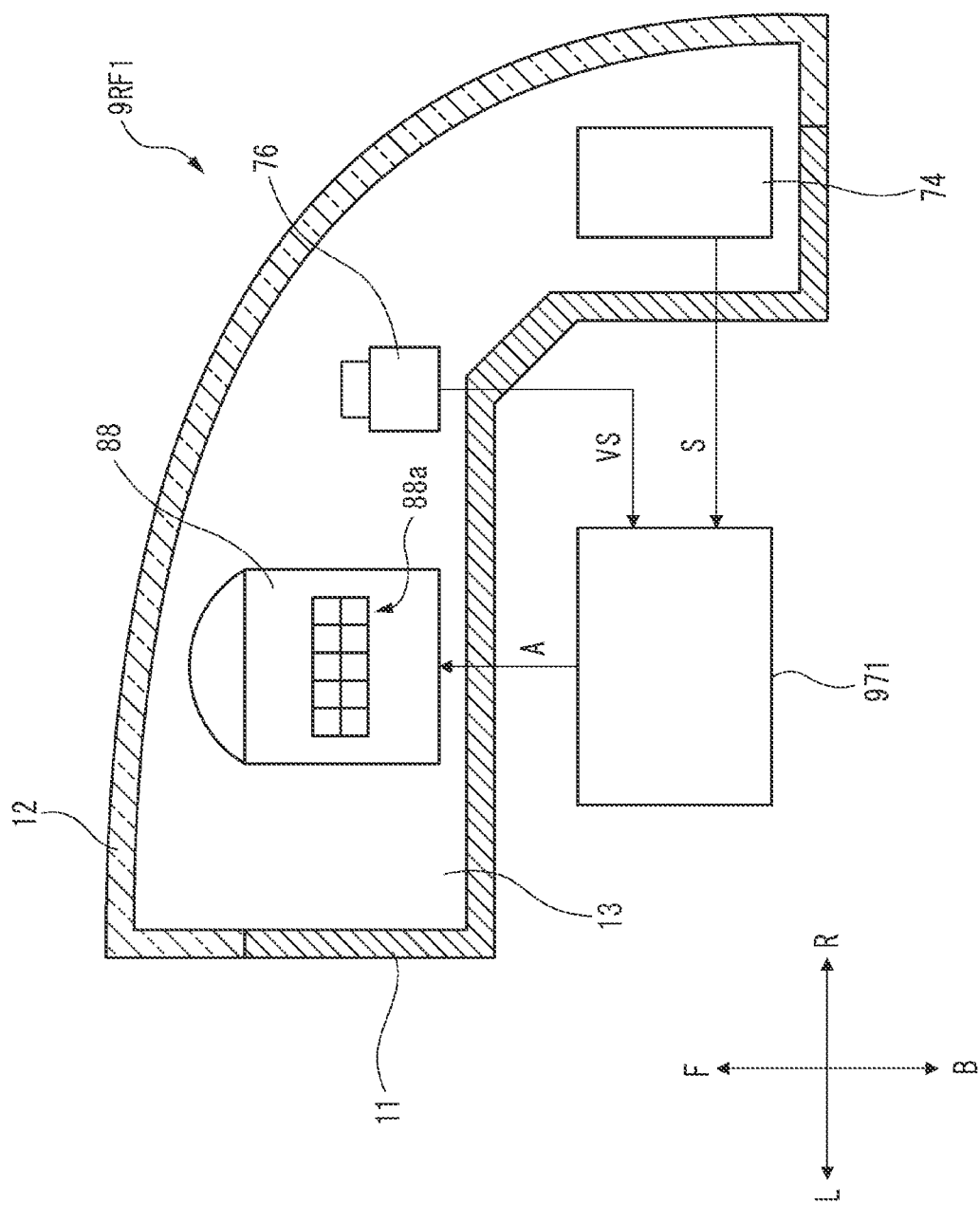
FIG. 18 illustrates a sensor system according to a modified example of the ninth embodiment.

FIG. 18 schematically shows a right front sensor system 9RF1 according to a modified example of the ninth embodiment. Although not shown, a left front sensor system mounted on the left front corner of the vehicle 100 has a configuration symmetrical with the right front sensor system 9RF1. Components that are the same as or equivalent to those of the right front sensor system 9RF according to the ninth embodiment are assigned with the same reference numerals, and repetitive descriptions for those will be omitted.

The right front sensor system 9RF1 includes a signal processor 971, which is an example of the corrector. The signal processor 971 may be realized as a function of an electronic control unit (ECU) mounted on the vehicle 100, or may be realized as a function of a control device disposed in the lamp chamber 13.

After the right front sensor system 9RF1 is mounted on the vehicle 100, the signal processor 971 specifies the deviation amount of the imaging reference position of the camera 76 from the predetermined position based on the video signal VS output from the camera 76.

The signal processor 971 is configured to receive the sensing signal S, and to correct the information obtained from the sensing signal S based on the deviation amount of the imaging reference point RP of the camera 76 (an example of information sensed by the second sensor). The correction may be performed on the sensing signal S itself, or may be performed on another signal or data corresponding to the sensing signal S. Since the operation of the signal processor 971 related to this point is the same as that of the signal processor 97 according to the ninth embodiment, repetitive descriptions for those will be omitted.

On the other hand, the signal processor 971 is configured to generate an adjustment signal A based on the specified deviation amount of the imaging reference point RP and input the same to the light source 88. The adjustment signal A includes information for adjusting the lighting reference position of the light source 88 in at least one of the up-down direction and the left-right direction. Since the operation of the signal processor 971 related to this point is the same as that of the signal processor 87 according to the second embodiment, repetitive descriptions for those will be omitted.

The above-described embodiments are merely examples for facilitating understanding of the gist of the presently disclosed subject matter. The configuration according to each of the above embodiments can be appropriately modified or improved without departing from the gist of the presently disclosed subject matter.

In the seventh to ninth embodiments, the LiDAR sensor 74 and the camera 76 are housed in the shared housings 11. The advantages explained by referring to each of the above embodiments can be more remarkable when an attempt is made to locate the LiDAR sensor 74 and the camera 76 in the lamp chamber 13 with a limited space.

In addition, by accommodating the LiDAR sensor 74 and the camera 76 in a common housing 11, the relative position changes between them can be minimized. Accordingly, the association between the sensing reference position of the LiDAR sensor 74 and the imaging reference position of the camera 76 can be enhanced.

However, the LiDAR sensor 74 and the camera 76 may be housed in separate housings. Alternatively, the LiDAR sensors 74 may be mounted on the exterior of a housing accommodating the camera 76.

In the seventh to ninth embodiments, the light source 78 (88) is housed in a housing 11 that is shared by the LiDAR sensor 74 and the camera 76. The advantages explained by referring to each of the seventh to ninth embodiments can be more remarkable when an attempt is made to locate the light source 78 (88), the LiDAR sensor 74, and the camera 76 in the lamp chamber 13 with a limited space.

In addition, by accommodating the light source 78 (88), LiDAR sensor 74, and camera 76 in common housing 11, the relative position changes between the three items can be minimized. Accordingly, the association among the lighting reference position of the light source 78 (88), the sensing reference position of the LiDAR sensor 74, and the imaging reference position of the camera 76 can be enhanced.

However, the light source 78 (88) may be housed in a housing that is different from the housing in which the LiDAR sensor 74 and the camera 76 are housed.

In the seventh to ninth embodiments, the camera 76 is arranged to obtain images of at least ahead of the vehicle 100, and the LiDAR sensors 74 are arranged to obtain information of at least on the right of the vehicle 100. However, the LiDAR sensor 74 may be arranged so as to obtain information of at least ahead of the vehicle 100.

In the seventh to ninth embodiments, a LiDAR sensor is used as a sensor for obtaining information of the outside of the vehicle 100. However, a sensor to be used may be appropriately selected depending on the type of information to be obtained. As such a sensor, a millimeter wave radar sensor, an ultrasonic sonar, a visible light camera, a non-visible light camera or the like can be exemplified. That is, an example of the "second sensor configured to sense information of the outside of the vehicle in a different manner from the first sensor" includes a camera having the same configuration as the camera 76 but having a different sensing range (sensing reference position).

In the seventh to ninth embodiments, a camera 76 for capturing an image of the outside of the vehicle 100 is used as a sensor for providing information for adjusting the posture (sensing reference position) of one of a plurality of types of sensors. In a case where the positional deviation of the sensor constituting the sensor system with respect to the vehicle body is obtained as information, such information can be obtained relatively easily on the basis of the image processing. However, if it is appropriate to use other information to adjust the sensing reference position of another sensor, a type of sensor suitable for obtaining such information may be suitably employed. For example, a configuration is conceivable in which the sensing reference position of another sensor is adjusted based on information such as the posture of the vehicle body obtained using the acceleration sensor.

In the seventh to ninth embodiments, the left front sensor system and the right front sensor system are exemplified as the sensor system comprising the LiDAR sensor 74 and the camera 76. However, the configuration described with reference to the right front sensor system is also applicable to a left rear sensor system disposed in the left rear corner of the vehicle 100 shown in FIG. 1 and a right rear sensor system disposed in the right rear corner of the vehicle 100. For example, the right rear sensor system may have a configuration that is symmetrical with the right front sensor system relative to the front-rear direction. The rear left sensor system may have a configuration symmetrical with the rear right sensor system relative to the left-right direction.

The present application is based on Japanese Patent Application No. 2016-158725 filed on Aug. 12, 2016, Japanese Patent Application No. 2016-158726 filed on Aug. 12, 2016, and Japanese Patent Application No. 2017-055703 filed on Mar. 22, 2017, the entire contents of which are incorporated herein by reference.

The invention claimed is:

1. A lighting system adapted to be mounted on a vehicle, comprising:
   a light source configured to emit light for lighting a predetermined area;
   a sensor configured to sense information of an outside of the vehicle;
   a first adjuster configured to adjust posture of the light source; and
   a second adjuster configured to adjust posture of the sensor,
   wherein adjustment by one of the first adjuster and the second adjuster is performed on the basis of adjustment that has been performed by the other one of the first adjuster and the second adjuster.

2. The lighting system according to claim 1,
   wherein the first adjuster includes a first screw mechanism;
   wherein the second adjuster includes a second screw mechanism; and
   wherein the lighting system comprises a flexible shaft configured to transmit an actuation with respect to one of the first screw mechanism and the second screw mechanism to the other one of the first screw mechanism and the second screw mechanism.

3. The lighting system according to claim 2,
   wherein at least one of the first screw mechanism and the second screw mechanism is coupled to the flexible shaft via a reduction gear mechanism.

4. The lighting system according to claim 1,
wherein one of the first adjuster and the second adjuster includes a screw mechanism;
wherein the other one of the first adjuster and the second adjuster includes an actuator;
wherein the lighting system comprises a sensor configured to output a sensing signal corresponding to an actuation with respect to the screw mechanism; and
wherein an actuation signal corresponding to the sensing signal is input to the actuator.

5. The lighting system according to claim 1,
wherein the first adjuster includes a first actuator;
wherein the second adjuster includes a second actuator; and
wherein a signal corresponding to an actuation performed by one of the first actuator and the second actuator is input to the other one of the first actuator and the second actuator.

6. The lighting system according to claim 1,
wherein the light source is configured to emit light to form a pattern to be used to perform the adjustment by the one of the first adjuster and the second adjuster.

7. The lighting system according to claim 1,
wherein the light source is disposed so as to light at least a front-rear direction of the vehicle; and
wherein the sensor is disposed so as to obtain information of at least on the left and on the right of the vehicle.

8. A lighting system adapted to be mounted on a vehicle, comprising:
a light source configured to emit light for lighting a predetermined area; and
a sensor configured to sense information of an outside of the vehicle,
wherein adjustment of a lighting reference position of the light source and a sensing reference position of the sensor is performed on the basis of adjustment that has been performed by the other one of the lighting reference position and the sensing reference position.

9. The lighting system according to claim 8,
wherein the light source is configured to emit light to form a pattern to be used to perform the adjustment of the one of the lighting reference position and the sensing reference position.

10. The lighting system according to claim 8,
wherein the light source is disposed so as to light at least a front-rear direction of the vehicle; and
wherein the sensor is disposed so as to obtain information of at least on the left and on the right of the vehicle.

11. A lighting system adapted to be mounted on a vehicle, comprising:
a light source configured to emit light for lighting a predetermined area;
a sensor configured to sense information of an outside of the vehicle; and
a corrector configured to correct the information sensed by the sensor on the basis of information as to a lighting reference position of the light source.

12. The lighting system according to claim 11,
wherein the light source is configured to emit light to form a pattern to be used to obtain the information as to the lighting reference position.

13. The lighting system according to claim 11,
the light source is disposed so as to light at least a front-rear direction of the vehicle; and
wherein the sensor is disposed so as to obtain information of at least on the left and on the right of the vehicle.

* * * * *